United States Patent
Jordan, II et al.

(10) Patent No.: US 10,346,811 B1
(45) Date of Patent: Jul. 9, 2019

(54) SYSTEMS AND METHODS FOR RESPONDING TO A BROKEN CIRCUIT

(71) Applicant: STATE FARM MUTUAL AUTOMOBILE INSURANCE COMPANY, Bloomington, IL (US)

(72) Inventors: Jackie O. Jordan, II, Bloomington, IL (US); John Donovan, Bloomington, IL (US); David Turrentine, Bloomington, IL (US); Torri Wollenschlager, Bloomington, IL (US); Bryan R. Nussbaum, Bloomington, IL (US); Deanna Stockweather, Normal, IL (US); Jeffrey W. Stoiber, Bloomington, IL (US); Kerstin Markwardt, Phoenix, AZ (US); Gail L. Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Bloomington, IL (US); Michael Harris, Jr., Normal, IL (US); Jennylind Sun, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 833 days.

(21) Appl. No.: 14/873,771

(22) Filed: Oct. 2, 2015

Related U.S. Application Data

(60) Provisional application No. 62/220,383, filed on Sep. 18, 2015, provisional application No. 62/201,671,
(Continued)

(51) Int. Cl.
*G06Q 40/08* (2012.01)
*G06Q 10/00* (2012.01)

(52) U.S. Cl.
CPC ............. *G06Q 10/20* (2013.01); *G06Q 40/08* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS

| 3,817,161 A | 6/1974 | Koplon |
| 3,875,612 A | 4/1975 | Poitras |

(Continued)

FOREIGN PATENT DOCUMENTS

| CN | 202865924 U | 4/2013 |
| WO | WO-2013/076721 A1 | 5/2013 |
| WO | WO-2014/207558 A2 | 12/2014 |

OTHER PUBLICATIONS

U.S. Appl. No. 14/692,864, Nonfinal Office Action, dated May 16, 2017.
(Continued)

*Primary Examiner* — Frantzy Poinvil
(74) *Attorney, Agent, or Firm* — Marshall, Gerstein & Borun LLP; Randall G. Rueth

(57) ABSTRACT

Risk of damage that is caused by the breaking of a circuit may be mitigated. A smart home controller and/or insurance provider remote processor may analyze data, with an insured's permission, received from a smart device disposed on, within, or proximate to a property associated with monitoring the flow of electricity. If it is determined that risk of damage due to the flow of electricity being cut off repeatedly exists, the smart home controller or remote
(Continued)

processor may automatically generate a repair request to schedule a repair event that mitigates the risks. The smart home controller may transmit information about the risks to a homeowner and/or an insurance provider. The insurance provider remote processor may interpret the transmitted data and perform insurance activities, such as providing a discount or premium, and/or adjusting an insurance policy associated with the property based upon the insured property being equipped with risk mitigation functionality.

20 Claims, 9 Drawing Sheets

Related U.S. Application Data filed on Aug. 6, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,651, filed on Jul. 1, 2015, provisional application No. 62/187,624, filed on Jul. 1, 2015, provisional application No. 62/187,642, filed on Jul. 1, 2015, provisional application No. 62/187,666, filed on Jul. 1, 2015, provisional application No. 62/187,645, filed on Jul. 1, 2015, provisional application No. 62/105,407, filed on Jan. 20, 2015, provisional application No. 62/060,962, filed on Oct. 7, 2014.

(58) Field of Classification Search
USPC ..................................................... 705/3–44
See application file for complete search history.

(56) References Cited

U.S. PATENT DOCUMENTS

| | | |
|---|---|---|
| 5,099,751 A | 3/1992 | Newman et al. |
| 5,128,859 A | 7/1992 | Carbone et al. |
| 5,554,433 A | 9/1996 | Perrone, Jr. et al. |
| 5,903,426 A | 5/1999 | Ehling |
| 6,023,762 A | 2/2000 | Dean et al. |
| 6,155,324 A | 12/2000 | Elliott et al. |
| 6,222,455 B1 | 4/2001 | Kaiser |
| 6,526,807 B1 | 3/2003 | Doumit et al. |
| 6,812,848 B2 | 11/2004 | Candela |
| 7,030,767 B2 | 4/2006 | Candela |
| 7,194,416 B1 | 3/2007 | Provost et al. |
| 7,309,216 B1 | 12/2007 | Spadola, Jr. et al. |
| 7,348,882 B2 | 3/2008 | Adamczyk et al. |
| 7,598,856 B1 | 10/2009 | Nick et al. |
| 7,715,036 B2 | 5/2010 | Silverbrook et al. |
| 7,809,587 B2 | 10/2010 | Dorai et al. |
| 7,813,822 B1 | 10/2010 | Hoffberg |
| 8,031,079 B2 | 10/2011 | Kates |
| 8,041,636 B1 | 10/2011 | Hunter et al. |
| 8,106,769 B1 | 1/2012 | Maroney et al. |
| 8,108,271 B1 | 1/2012 | Duncan et al. |
| 8,229,861 B1 | 7/2012 | Trandal et al. |
| 8,280,633 B1 | 10/2012 | Eldering et al. |
| 8,289,160 B1 | 10/2012 | Billman |
| 8,316,237 B1 | 11/2012 | Felsher et al. |
| 8,400,299 B1 | 3/2013 | Maroney et al. |
| 8,510,196 B1 | 8/2013 | Brandmaier et al. |
| 8,527,306 B1 | 9/2013 | Reeser et al. |
| 8,533,144 B1 | 9/2013 | Reeser et al. |
| 8,595,034 B2 | 11/2013 | Bauer et al. |
| 8,596,293 B2 | 12/2013 | Mous et al. |
| 8,605,209 B2 | 12/2013 | Becker |
| 8,620,841 B1 | 12/2013 | Filson et al. |
| 8,621,097 B2 | 12/2013 | Venkatakrishnan et al. |
| 8,650,048 B1 | 2/2014 | Hopkins, III et al. |
| 8,694,501 B1 | 4/2014 | Trandal et al. |
| 8,712,893 B1 | 4/2014 | Brandmaier et al. |
| 8,730,039 B1 | 5/2014 | Billman |
| 8,731,975 B2 | 5/2014 | English et al. |
| 8,749,381 B1 | 6/2014 | Maroney et al. |
| 9,049,168 B2 | 6/2015 | Jacob et al. |
| 9,280,252 B1 | 3/2016 | Brandmaier et al. |
| 9,297,150 B2 | 3/2016 | Klicpera |
| 9,424,606 B2 | 8/2016 | Wilson, II et al. |
| 9,429,925 B2 | 8/2016 | Wait |
| 9,652,976 B2 | 5/2017 | Bruck et al. |
| 9,654,434 B2 | 5/2017 | Sone et al. |
| 9,824,397 B1 | 11/2017 | Patel et al. |
| 9,892,463 B1 | 2/2018 | Hakimi-Boushehri et al. |
| 9,898,912 B1 | 2/2018 | Jordan, II et al. |
| 2002/0040306 A1 | 4/2002 | Sugiyama et al. |
| 2004/0054789 A1 | 3/2004 | Breh et al. |
| 2004/0177032 A1 | 9/2004 | Bradley et al. |
| 2004/0211228 A1 | 10/2004 | Nishio et al. |
| 2004/0214566 A1* | 10/2004 | Suzuki .................. G05B 15/02 455/423 |
| 2005/0030175 A1 | 2/2005 | Wolfe |
| 2005/0080520 A1 | 4/2005 | Kline et al. |
| 2005/0139420 A1 | 6/2005 | Spoltore et al. |
| 2005/0251427 A1 | 11/2005 | Dorai et al. |
| 2005/0275527 A1 | 12/2005 | Kates |
| 2006/0033625 A1 | 2/2006 | Johnson et al. |
| 2006/0100912 A1 | 5/2006 | Kumar et al. |
| 2006/0154642 A1 | 7/2006 | Scannell |
| 2006/0184379 A1 | 8/2006 | Tan et al. |
| 2008/0018474 A1 | 1/2008 | Bergman et al. |
| 2008/0019392 A1 | 1/2008 | Lee |
| 2008/0184272 A1 | 7/2008 | Brownewell |
| 2008/0285797 A1 | 11/2008 | Hammadou |
| 2009/0001891 A1 | 1/2009 | Patterson |
| 2009/0044595 A1 | 2/2009 | Vokey |
| 2009/0094129 A1 | 4/2009 | Rhodes et al. |
| 2009/0243852 A1 | 10/2009 | Haupt et al. |
| 2009/0259581 A1 | 10/2009 | Horowitz et al. |
| 2009/0265193 A1 | 10/2009 | Collins et al. |
| 2010/0073840 A1 | 3/2010 | Hennessey, Jr. |
| 2010/0235285 A1 | 9/2010 | Hoffberg |
| 2010/0299217 A1 | 11/2010 | Hui |
| 2011/0003577 A1 | 1/2011 | Rogalski et al. |
| 2011/0077875 A1 | 3/2011 | Tran et al. |
| 2011/0112660 A1 | 5/2011 | Bergmann et al. |
| 2011/0161117 A1 | 6/2011 | Busque et al. |
| 2012/0016695 A1 | 1/2012 | Bernard et al. |
| 2012/0101855 A1 | 4/2012 | Collins et al. |
| 2012/0116820 A1* | 5/2012 | English .............. H04L 61/2007 705/4 |
| 2012/0166115 A1 | 6/2012 | Apostolakis |
| 2012/0188081 A1 | 7/2012 | Van Katwijk |
| 2012/0191498 A1* | 7/2012 | Singh ................. G05B 23/0283 705/7.13 |
| 2012/0265586 A1 | 10/2012 | Mammone |
| 2012/0290333 A1 | 11/2012 | Birchall |
| 2013/0049950 A1 | 2/2013 | Wohlert |
| 2013/0096960 A1 | 4/2013 | English et al. |
| 2013/0144486 A1 | 6/2013 | Ricci |
| 2013/0159021 A1 | 6/2013 | Felsher |
| 2013/0226624 A1 | 8/2013 | Blessman et al. |
| 2013/0234840 A1 | 9/2013 | Trundle et al. |
| 2013/0257626 A1 | 10/2013 | Masli et al. |
| 2013/0263611 A1* | 10/2013 | Kearney ................. F28F 27/00 62/56 |
| 2013/0290033 A1 | 10/2013 | Reeser et al. |
| 2014/0122133 A1 | 5/2014 | Weisberg et al. |
| 2014/0136242 A1 | 5/2014 | Weekes et al. |
| 2014/0180723 A1 | 6/2014 | Cote et al. |
| 2014/0201315 A1 | 7/2014 | Jacob et al. |
| 2014/0201844 A1 | 7/2014 | Buck |
| 2014/0222329 A1 | 8/2014 | Frey |
| 2014/0222469 A1 | 8/2014 | Stahl et al. |
| 2014/0238511 A1 | 8/2014 | Klicpera |
| 2014/0244997 A1 | 8/2014 | Goel et al. |
| 2014/0266717 A1 | 9/2014 | Warren et al. |

(56) References Cited

U.S. PATENT DOCUMENTS

| | | |
|---|---|---|
| 2014/0278571 A1 | 9/2014 | Mullen et al. |
| 2014/0303801 A1 | 10/2014 | Ahn et al. |
| 2014/0340216 A1 | 11/2014 | Puskarich |
| 2014/0358592 A1 | 12/2014 | Wedig et al. |
| 2014/0379156 A1 | 12/2014 | Kamel et al. |
| 2015/0154712 A1 | 6/2015 | Cook |
| 2015/0160636 A1 | 6/2015 | McCarthy, III et al. |
| 2015/0163412 A1 | 6/2015 | Holley et al. |
| 2015/0170288 A1 | 6/2015 | Harton et al. |
| 2015/0206249 A1 | 7/2015 | Fini |
| 2015/0287310 A1 | 10/2015 | Deliuliis et al. |
| 2015/0332407 A1 | 11/2015 | Wilson, II et al. |
| 2015/0364028 A1 | 12/2015 | Child et al. |
| 2016/0018226 A1 | 1/2016 | Plocher et al. |
| 2016/0042463 A1 | 2/2016 | Gillespie |
| 2016/0078744 A1 | 3/2016 | Gieck |
| 2016/0104250 A1 | 4/2016 | Allen et al. |
| 2017/0147722 A1 | 5/2017 | Greenwood |
| 2017/0304659 A1 | 10/2017 | Chen et al. |

OTHER PUBLICATIONS

U.S. Appl. No. 14/692,946, Nonfinal Office Action, dated Apr. 4, 2017.
U.S. Appl. No. 14/692,961, Nonfinal Office Action, dated Apr. 14, 2017.
U.S. Appl. No. 14/693,021, Nonfinal Office Action, dated Jun. 30, 2017.
U.S. Appl. No. 14/693,034, Nonfinal Office Action, dated May 17, 2017.
U.S. Appl. No. 14/693,039, Nonfinal Office Action, dated Jun. 5, 2017.
U.S. Appl. No. 14/693,057, Nonfinal Office Action, dated Aug. 21, 2017.
U.S. Appl. No. 14/873,823, Final Office Action, dated Mar. 15, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/692,943, Nonfinal Office Action, dated Sep. 12, 2017.
U.S. Appl. No. 14/692,961, Final Office Action, dated Sep. 1, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
Knutsen, Confusion about causation in insurance: solutions for catastrophic losses, Ala. L. Rev., 5:957-1023 (2010).
U.S. Appl. No. 14/692,864, Final Office Action, dated Nov. 8, 2017.
U.S. Appl. No. 14/692,946, Final Office Action, dated Oct. 30, 2017.
U.S. Appl. No. 14/692,953, Nonfinal Office Action, dated Sep. 19, 2017.
U.S. Appl. No. 14/692,961, Nonfinal Office Action, dated Dec. 28, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Nov. 3, 2017.
U.S. Appl. No. 14/873,864, Notice of Allowance, dated Dec. 21, 2017.
U.S. Appl. No. 14/873,914, Nonfinal Office Action, dated Dec. 26, 2017.
U.S. Appl. No. 14/873,942, Nonfinal Office Action, dated Nov. 22, 2017.
System for Loss Prevention, IP.com, published Nov. 8, 2008.
U.S. Appl. No. 14/692,864, Nonfinal Office Action, dated May 24, 2018.
U.S. Appl. No. 14/692,943, Notice of Allowance, dated May 1, 2018.
U.S. Appl. No. 14/692,946, Nonfinal Office Action, dated Apr. 6, 2018.
U.S. Appl. No. 14/692,953, Final Office Action, dated Apr. 27, 2018.
U.S. Appl. No. 14/692,961, Final Office Action, dated Jun. 20, 2018.
U.S. Appl. No. 14/693,021, Final Office Action, dated Jan. 25, 2018.
U.S. Appl. No. 14/693,021, Final Office Action, dated Jauary 25, 2018.
U.S. Appl. No. 14/693,032, Final Office Action, dated Mar. 22, 2018.
U.S. Appl. No. 14/693,032, Notice of Allowance, dated Jun. 22, 2018.
U.S. Appl. No. 14/693,039, Nonfinal Office Action, dated May 3, 2018.
U.S. Appl. No. 14/693,057, Final Office Action, dated Feb. 7, 2018.
U.S. Appl. No. 14/873,722, Final Office Action, dated Jun. 15, 2018.
U.S. Appl. No. 14/873,783, Final Office Action, dated May 23, 2018.
U.S. Appl. No. 14/873,823, Final Office Action, dated Jun. 29, 2018.
U.S. Appl. No. 14/873,823, Nonfinal Office Action, dated Feb. 23, 2018.
U.S. Appl. No. 14/873,864, Corrected Notice of Allowability, dated Jan. 18, 2018.
U.S. Appl. No. 14/873,864, Corrected Notice of Allowance, dated Jan. 18, 2018.
U.S. Appl. No. 14/873,942, Nonfinal Office Action, dated Mar. 16, 2018.
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,305, Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/859,859, filed Jan. 2, 2018, Hakmi-Boushehri et al., "Systems and Methods for Community-Based Cause of Loss Determination".
U.S. Appl. No. 15/895,149, filed Feb. 13, 2018, Jordan et al., Systems and Methods for Automatically Generating an Escape Route.

\* cited by examiner

SYSTEMS AND METHODS FOR RESPONDING TO A BROKEN CIRCUIT

CROSS-REFERENCE TO RELATED APPLICATIONS

This application claims benefit of the filing date of U.S. Provisional Patent Application Nos. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to automatically responding to the presence of a broken circuit, and, more particularly, to systems and methods that leverage a plurality of smart appliances or devices to mitigate risks associated with the breaking of the circuit.

BACKGROUND

There are many emergency situations that may impact buildings and the people located within the buildings. In some such emergency situations, a circuit breaker may be tripped and/or other indicators of electrical faults may manifest on the property. While the circuit breaker may prevent some immediate consequences associated with short circuits and/or electrical faults, the power cut caused by a circuit breaker may itself create risks. Currently, many appliances and other goods are capable of communicating information about their operation via mesh networks as part of the "internet of things." However, there is no way to aggregate and analyze all of this communicated data to reduce the resources required to react to the tripping of a circuit breaker. Further, there is no way to analyze the data to determine the most appropriate response to mitigate the risks associated with the detection of the electrical fault.

SUMMARY

The present embodiments may, inter alia, detect that a flow of electricity has been cut off, such as when a circuit breaker is tripped. For instance, a system and method may facilitate communications with connected devices and items, and/or facilitate notifying an individual and/or insurance provider as to the of flow electricity being cut off. The present embodiments may monitor sensor data received from a plurality of devices populated on the premises of the property. Each of the plurality of devices may be configured to monitor various conditions of the property to determine that a flow of electricity has been cut off. A controller may determine that the flow of electricity being cut off poses risks of damage to the property and/or individuals located thereon. The controller may also generate instructions that may be performed by the plurality of devices to mitigate these risks.

In one aspect, a computer-implemented method of repairing damage to a property may be provided. The property may be populated with a plurality of devices, including a circuit monitoring device, associated with the property. The method may comprise, with customer permission or affirmative consent, (1) determining, by one or more processors, that the circuit monitoring device cut off a flow of electricity through a monitored circuit; (2) responsive to the determination, transmitting, via a first wired or wireless communication network to the circuit monitoring device, an instruction to re-close the monitored circuit; (3) subsequent to transmitting the instruction, determining, by the one or more processors, that the circuit monitoring device cut off the flow of electricity through the monitored circuit; (4) responsive to the second determination, generating, by the one or more processors, a repair request, the repair request indicating a need to repair an electrical condition associated with the monitored circuit; and/or (5) communicating, to a repair service provider via a second wired or wireless communication network, the repair request, wherein communicating the repair request causes a repair event to be scheduled. The method may include additional, less, or alternate actions, including those discussed elsewhere herein.

In another aspect, a system for repairing damage to a property populated with a plurality of devices, including a circuit monitoring device associated with the property may be provided. The system may comprise (i) a plurality of transceivers adapted to communicate data; (ii) a memory adapted to store non-transitory computer executable instructions; and/or (iii) one or more processors adapted to interface with the plurality of transceivers. The one or more processors may be configured to execute the non-transitory computer executable instructions to cause the system to (1) determine, by the one or more processors, that the circuit monitoring device cut off a flow of electricity through a monitored circuit; (2) responsive to the determination, transmit, via the plurality of transceivers to the circuit monitoring device, an instruction to re-close the monitored circuit; (3)

subsequent to transmitting the instruction, determine, by the one or more processors, that the circuit monitoring device cut off the flow of electricity through the monitored circuit; (4) responsive to the second determination, generate, by the one or more processors, a repair request, the repair request indicating a need to repair an electrical condition associated with the monitored circuit; and/or (5) communicate, to a repair service provider via the plurality of transceivers, the repair request, wherein communicating the repair request causes a repair event to be scheduled. The system may include additional, less, or alternate actions, including those discussed elsewhere herein.

In another aspect, a non-transitory computer-readable storage medium storing processor-executable instructions may be provided. When executed, the instructions may cause one or more processors to (1) determine, by the one or more processors, that the circuit monitoring device cut off a flow of electricity through a monitored circuit; (2) responsive to the determination, transmit, via a first wired or wireless communication network to the circuit monitoring device, an instruction to re-close the monitored circuit; (3) subsequent to transmitting the instruction, determine, by the one or more processors, that the circuit monitoring device cut off the flow of electricity through the monitored circuit; (4) responsive to the second determination, generate, by the one or more processors, a repair request, the repair request indicating a need to repair an electrical condition associated with the monitored circuit; and/or (5) communicate, to a repair service provider via the first wired or wireless communication network, the repair request, wherein communicating the repair request causes a repair event to be scheduled. The instructions may cause additional, less, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
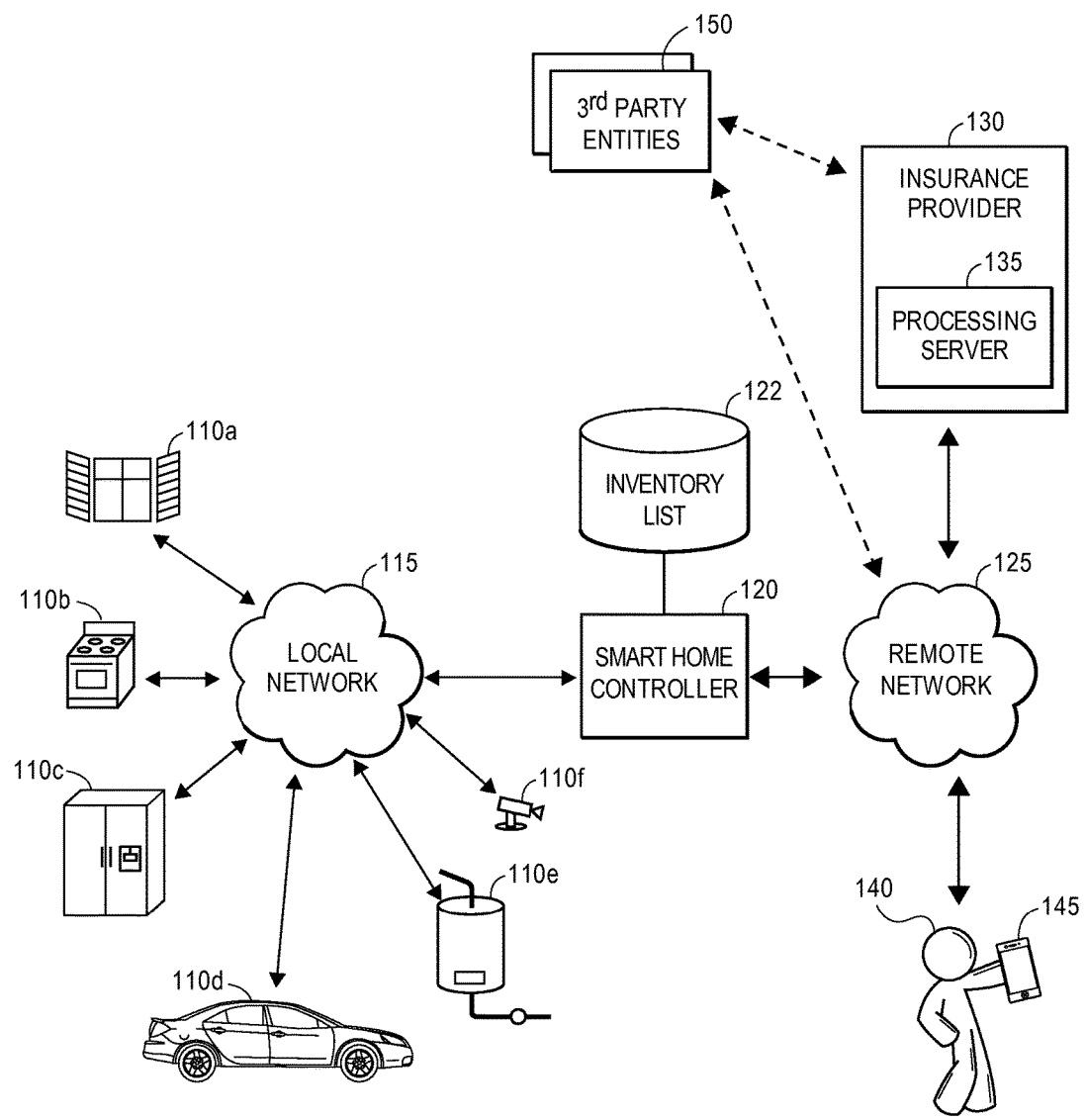
FIG. 1 depicts an exemplary environment including components and entities associated with generating a response to detecting a broken circuit on a property, in accordance with some embodiments.

The present embodiments may relate to, inter alia, the mitigation, prevention, or other action to avoid risks caused by breaking a circuit on a property. The present embodiments may also relate to (a) detecting the presence of the broken circuit; (b) determining a response; (c) directing the performance of the fore-mentioned response; (d) informing an individual about risks associated with the broken circuit; (e) managing insurance policies; (f) preventing or mitigating home damage; and/or (g) other connected home-related activities.

A home may have a "smart" central controller (referred to as a "smart home controller" herein, or "smart building controller" for an office building) and be wirelessly interconnected, or even hard-wired, with various household related items and/or sensors. Despite being referred to as the "smart home controller," the central controller may be associated with any type of property, such as offices, restaurants, farms, and/or other types of properties. The smart home controller may be in wireless or wired communication with various smart appliances (e.g., clothes washer, dryer, dish washer, refrigerator, etc.), smart heating devices (e.g., furnace, space heaters, etc.), smart cooling devices (e.g., air conditioning units, fans, ceiling fans, etc.), smart plumbing fixtures (e.g., toilets, showers, water heaters, piping, interior and yard sprinklers, etc.), smart cooking devices (e.g., stoves, ovens, grills, microwaves, etc.), smart wiring, lighting, and lamps, smart personal vehicles, smart thermostats, smart windows, doors, or garage doors, smart window blinds or shutters, and/or other smart devices and/or sensors capable of wireless or wired communication. Each smart device (or smart sensor), as well as the smart home controller, may be equipped with a processor, memory unit, software applications, wireless transceivers, local power supply, various types of sensors, and/or other components.

Each of the smart devices may be referenced by an inventory list associated with the property. The inventory list may detail a location (e.g., GPS coordinates, a room of the property, an area or section of the property, or other location indication) of each of the smart devices. In this regard, multiple smart devices may be associated with a single area or location of the property (e.g., a basement, a bathroom, a kitchen, a first floor, a hallway, a garage, a master bedroom, a child's bedroom, living room, family room, basement, higher floors for multi-story office buildings, etc.). Similarly, the inventory list may indicate the capabilities of each of the smart devices. For example, a smart circuit breaker may be able to automatically re-close a broken circuit. Of course, the capabilities of each smart device may vary between smart devices.

In some embodiments, the inventory list may also include service and/or repair information. As used generally herein, the phrase "service log" may refer to the compilation of service and/or repair information. In particular, the repair log information may include an identity of the smart device, a location of the smart device, a time at which repair events occurred, an identity of an entity performing each repair event, an indication of a component that was repaired during the repair event, and/or the like. The service log information may be manually entered by a user or automatically determined based upon various factors. In some embodiments, the smart devices themselves may store and/or monitor the repair information, such as in a data tag or other type of storage or memory unit. Further, the service log may be accessible by remote electronic devices associated with a policyholder, such as, smart phones, tablets, computers, etc.

The smart home controller may remotely gather data from the smart devices (or smart sensors) dispersed around or otherwise interconnected within the property. The smart home controller may analyze the data and automatically detect the presence of a broken circuit that may have cut off the flow of electricity to one or more of the smart devices. This lack of electricity flowing to these smart devices may pose risks of damage to the property and/or individuals located thereon. As it is user herein, the phrase "broken circuit" refers to a tripped circuit monitoring device and/or other similar means to break a circuit in response to an unsafe electrical condition. The circuit monitoring device may be a circuit breaker, a ground fault circuit interrupter (GFCI), an appliance leakage current interrupter (ALCI), a residual-current device (RCD), a safety switch, an arc-fault circuit interrupter (AFCI), and/or any other device that detects unsafe electrical conditions within the property. The circuit monitoring device may be a smart circuit monitoring device capable of transmitting an electronic signal to the smart home controlled upon breaking a circuit in response to an electrical fault and/or short circuit. These smart circuit monitoring devices may be capable of receiving a remote instruction to re-close the broken circuit, restoring the flow of electricity through the circuit and/or the smart devices. Accordingly, upon receiving a signal indicating the presence of a broken circuit from a smart circuit monitoring device, the smart home controller may issue commands or messages via wireless or wired communication networks and/or data transmission to automatically and/or in near real-time re-close the broken circuit; thus, mitigating any risks of damage associated with the lack of electrical flow.

To mitigate the risk of damage to the property, the smart home controller may determine a location associated with the broken circuit and/or a location at which the flow of electricity was cut off and/or interrupted due to the broken circuit. The smart home controller may then utilize this location to query an inventory list. To this end, the smart home controller may determine a set of smart devices disposed in a location impacted by the broken circuit. The smart home controller may then determine if the lack of power to the set of smart devices poses a risk of damage to the property. For example, the smart home controller may determine that a smart circuit breaker in the basement was tripped as a result of a power surge. The smart home controller may then determine a location of the smart circuit breaker to query the inventory list. In this example, the smart home controller may determine that a sump pump in the basement was de-energized and/or otherwise cutoff from the flow of electricity due to the tripped circuit breaker. Accordingly, the smart home controller may generate an instruction to mitigate risks caused by the sump pump being de-energized. For example, the instruction may be to reroute power to sump pump from an alternative source, activate a backup generator associated with the sump pump, and/or automatically re-close the broken circuit.

The systems and methods discussed herein address a challenge that is particular to home automation. In particular, the challenge relates to a lack of user ability to effectively control certain components within a property in response to the occurrence of a broken circuit. This is particularly apparent when the user is not aware of the broken circuit and/or may be unable to manually perform actions to mitigate risks associated with the broken circuit (e.g., the individual is not on the property when the circuit is broken). In some cases, this delay may cause serious damage to the property. For example, if a flow of electricity to a sump pump is cut off, flooding may occur in a basement, potentially causing property damage and/or electrocution. Instead of requiring users to manually monitor for broken circuits and/or mitigate risks associated therewith, as required on conventional properties, the systems and methods dynamically detect the presence of the broken circuit and/or automatically perform a mitigative action in near real-time. Therefore, because the systems and methods employ dynamic operation of connected devices within a property, the systems and methods are necessarily rooted in computer technology in order to overcome the noted shortcomings that specifically arise in the realm of home and/or building automation.

Similarly, the systems and methods provide improvements in a technical field, namely, home (and/or building) automation. Instead of the systems and methods merely being performed by hardware components using basic functions, the systems and methods employ complex steps that go beyond the mere concept of simply retrieving and combining data using a computer. In particular, the hardware components may compile operation data of connected devices, analyze the operation data, determine the presence of a broken circuit, dynamically adjust device operation, communicate relevant data between or among a set of devices, and/or insurance providers, among other functionalities. This combination of elements impose meaningful limits in that the operations are applied to improve home automation by improving the consolidation and analysis of operation data, and by facilitating and/or enabling the efficient adjustment of connected device operation in a meaningful and effective way to mitigate risks associated with broken circuits.

According to implementations, the systems and methods may support a dynamic, real-time or near-real-time analysis of any received sensor data. In particular, the central controller and/or insurance provider may retrieve and/or receive real-time sensor data from the smart devices, analyze the sensor data in real time, and dynamically determine a set of actions or commands based upon the analysis. Additionally, the central controller and/or insurance provider may provide, in real-time, the set of actions or commands to the smart device (and/or to another device) to perform the command to manage its operation. Accordingly, the real-time capability of the systems and methods enable the smart devices to dynamically modify their operation to mitigate risks associated with the presence of the broken circuit on the property. Additionally, individuals associated with the property are afforded the benefit of being dynamically notified of the issues so that the individuals may take any additional or alternative mitigating actions.

The systems and methods therefore may offer a benefit by enabling homeowners to receive sufficient warning about electrical problems and to automatically minimize damage that may be caused thereby. The communication of these instructions to homeowners may result in the smart home controller mitigating risks of harm to devices disposed on the property and/or homeowners (and/or building occupants) themselves. The present systems and methods may also provide improvements, in certain aspects, to the technological fields of insurance, emergency response, appliance manufacturing, and/or urban planning.

I. Exemplary Environment for Responding to a Broken Circuit

FIG. 1 depicts an exemplary environment 100 associated generating a response to the detection of a broken circuit on a property. Although FIG. 1 depicts certain entities, components, and devices, it should be appreciated that additional or alternate entities and components are envisioned.

As illustrated in FIG. 1, the environment 100 may include a plurality of smart devices 110 that may be connected to a local communication network 115. As shown in FIG. 1, the plurality of smart devices 110 may include smart window shutters 110a, a smart oven 110b, a smart refrigerator 110c, a smart vehicle 110d, a smart water supply 110e, and/or a smart surveillance camera 110f. Although FIG. 1 depicts six smart devices in the environment 100, it should be appreciated that additional or fewer smart devices may be present in other embodiments. For instance, in some embodiments, the plurality of smart devices 110 may include a smart circuit monitoring device. In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may install a motor system on window shutters that is capable of transmitting the open/close status of the shutters, and/or remotely receiving instructions to open or close the shutters. As another example, when a vehicle owner enrolls in a usage-based vehicle insurance policy, the vehicle owner may be provided a smart device that is able to monitor the miles driven by the vehicle and, upon returning to the home, the smart device may communicate the number of miles driven since previously departing.

The plurality of smart devices 110 may be configured to communicate with a smart home controller 120 via the local communication network 115. The local network 115 may facilitate any type of data communication between devices and controllers located on or proximate to the property via any standard or technology (e.g., Bluetooth®, RFID, X10, UPnP®, IEEE 802 including Ethernet, GSM, CDMA, LTE, and/or others). According to present embodiments, the plurality of smart devices 110 may transmit, to the smart home controller 120 via the local network 115, sensor data gathered from sensors associated with the plurality of smart devices 110. The sensor data may be audio data, image or video data, or status data. For example, the sensor data may indicate that a circuit breaker has been tripped, and/or other indicators that a circuit has been broken.

The smart home controller 120 (or other smart building controller) may analyze the received sensor data and transmit, via the local network 115, instructions or commands to the plurality of smart devices 110. As an example, the smart home controller 120 may determine, via a smart circuit monitor, that a broken circuit is present in a kitchen. As a result, the smart home controller 120 may transmit an instruction to activate a backup generator associated with a refrigerator and/or other actions to mitigate the risks associated with the broken circuit. In some embodiments, the smart generator may respond by transmitting, to the smart home controller 120 via the local network 115, a confirmation that the action has been successfully performed.

According to present embodiments, the smart home controller 120 may be coupled to a database 122 that stores a list of smart devices on the property, such as the plurality of smart devices 110. In some embodiments, for each smart device listed in the database 122, the database 122 may contain a corresponding location of the smart device and/or a set of functions that the smart device is capable of performing. In some embodiments, the location of the smart device may be an indication of a specific location on a layout or virtual map of the property (whether a virtual map of a family home, multi-story office building, apartment building, or other type of structure, such as a luxury cruise ship). The smart home controller 120 may access the database 122 to determine a portion of the plurality of devices 110 located near the broken circuit and/or that no longer receive power due to broken circuit. Additionally, in some embodiments, the database 122 may include service log information relating to the plurality of devices 110. Although FIG. 1 depicts the database 122 as coupled to the smart home controller 120, it is envisioned that the database 122 may be maintained in the "cloud" such that any element of the environment 100 capable of communicating over either the local network 115 or a remote network 125 may directly interact with the database 122.

The smart home controller 120 may also be in communication, via the remote network 125, with an electronic device 145 associated with the homeowner 140. The electronic device 145 associated with the homeowner 140 may be a smartphone, a desktop computer, a laptop, a tablet, a smart watch, smart glasses, phablet, smart contact lenses, wearable electronics, pager, personal digital assistant, computing device configured for wireless communication, or any other electronic device. The remote network 125 may facilitate any data communication between the smart home controller 120 located on the property and entities or individuals remote to the property via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the remote network 125 may utilize the same technology. Although FIG. 1 depicts the smart home controller 120 and the homeowner 140 in communication via the remote network 125, there are embodiments in which the homeowner 140 is on the property and in communication with the smart home controller 120 via the local network 115.

In some embodiments, when the smart home controller 120 determines that a broken circuit is present on the property, the smart home controller 120 may generate and transmit a notification to the electronic device 145 via the local network 115 and/or the remote network 125. The notification may include, inter alia, a location of the broken circuit, a list of smart devices impacted by the broken circuit, and/or any other information relevant to informing the homeowner 140 as to the risks associated with the broken circuit. In some embodiments, the electronic device 145 may provide an interface enabling the homeowner 140 to view any of the transmitted information. The interface may also enable the homeowner 145 to manually direct the smart home controller 120 to generate instructions that mitigate risks associated with the broken circuit.

The smart home controller 120 may also be in communication with an insurance provider 130 via the remote network 125. According to present embodiments, the insurance provider 130 may include one or more processing servers 135 configured to facilitate the functionalities described herein. Although FIG. 1 depicts the insurance provider 130, it should be appreciated that other entities are benefited by monitoring broken circuits. For example, a general contractor may aggregate the broken circuit occurrence data across many properties to determine which appliances or products provide the best long-term value after accounting for an association with tripping circuit monitoring devices. Thus, it may not be necessary for the property to have an associated insurance policy for the property owners to enjoy the benefits of the systems and methods. Further, although FIG. 1 depicts the processing server 135 as part of the insurance provider 130, it should be appreciated that the processing server 135 may be separate from (and connected to and/or accessible by) the insurance provider 130 or other entity interested in monitoring the data described herein. In any event, the processing server 135 may be configured to perform an insurance-related action (e.g., generating an insurance claim) in response to the detection of the broken circuit.

According to present embodiments, the insurance provider 130 and/or smart home controller 120 may also be in communication with third party entities 150 pertaining to the detection of the broken circuit on the property. For example, the smart home controller 120 and/or the processing sever 135 may instruct a smart circuit monitor to re-close a circuit. If the same smart circuit monitor detects a broken circuit shortly after the re-closing, it may be indicative of a dangerous electrical condition on the property. Accordingly, the smart home controller 120 may communicate with a server associated with an electrician and/or other entity capable of performing electrical repairs to facilitate an inspection and/or repair of any electrical components that may have potentially caused the broken circuit. The exemplary environment 100 may include additional, fewer, or alternate equipment or components, including those discussed elsewhere herein.

II. Exemplary Broken Circuit Response Communication

Figure 2:
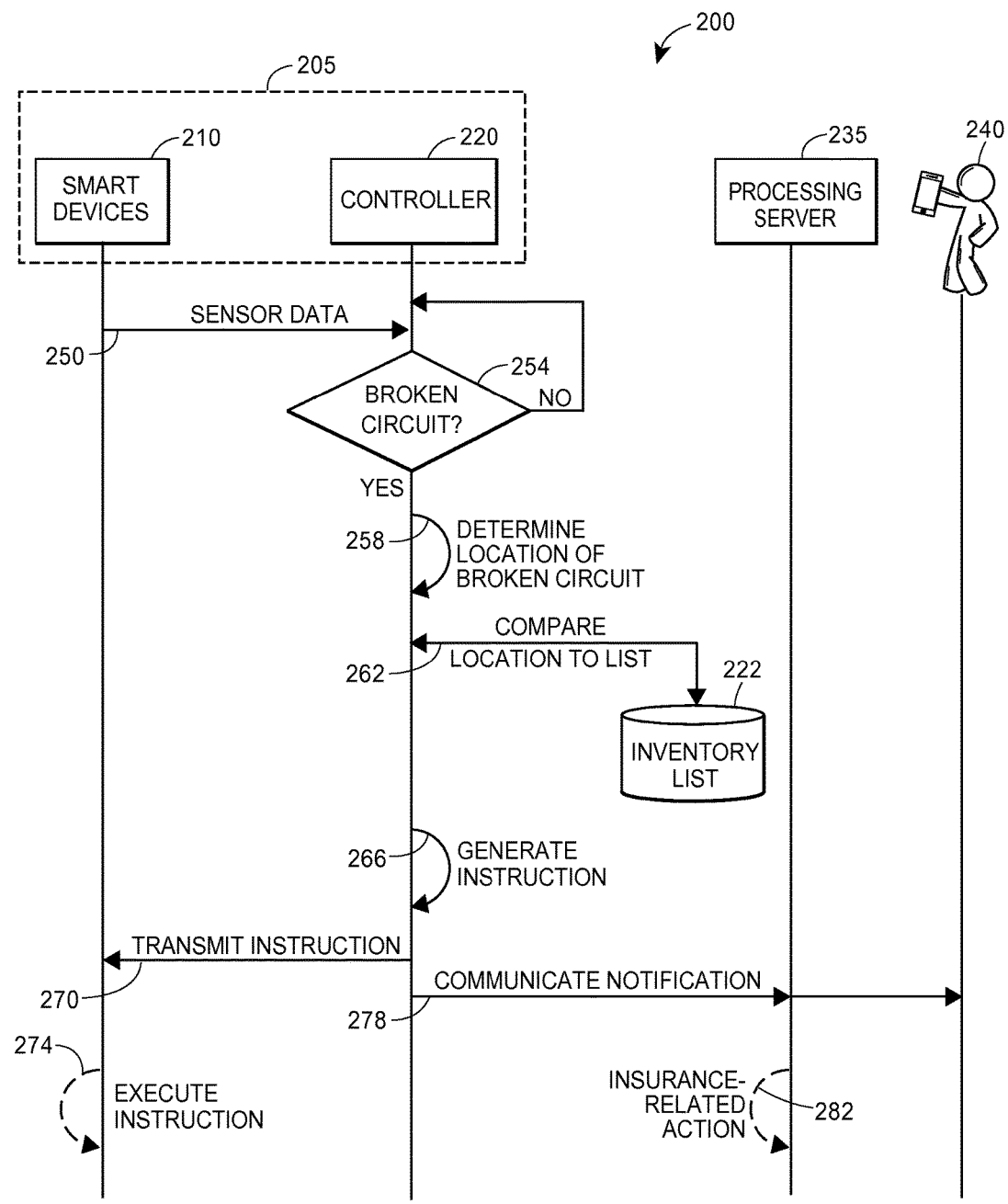
FIG. 2 depicts an exemplary signal diagram associated with generating a response to detecting a broken circuit on a property, in accordance with some embodiments.

Referring to FIG. 2, illustrated is a signal diagram 200 associated with generating a response to the detection of a broken circuit on a property. In particular, FIG. 2 may include a plurality of smart devices 210 (such as the plurality of smart devices 110 as described with respect to FIG. 1) disposed on a property 205, a smart home controller 220 (such as the smart home controller 120 as described with respect to FIG. 1, or a smart office building controller, or even a smart ship controller), a processing server 235 (such as the processing server 135 as described with respect to FIG. 1), and/or an individual 240 (such as the homeowner 140 as described with respect to FIG. 1) associated with an electronic device. In some embodiments, the smart home controller 220 may be coupled to a database that stores an inventory list (such as the inventory list 122 as described with respect to FIG. 1). It should be appreciated that the electronic device may be any electronic device (e.g., a smartphone, a desktop computer, a laptop, a tablet, phablet, netbook, notebook, a smart watch, smart glasses, smart contact lenses, wearable electronics device, other mobile device, etc.).

The signal diagram 200 may begin when the plurality of smart devices 210 transmit (250) operating data to the smart home controller 220 (or other types of controllers, including those discussed elsewhere herein). The operating data may include data, such as audio data, visual data, and status data, relevant to determining the presence of a broken circuit on the property 205. The plurality of smart devices 210 may be configured to transmit the operating data at a regular interval (e.g., every ten seconds) and/or in response to a trigger event (e.g., detecting the presence of a circuit breaker that was tripped in response to a ground-fault). Moreover, the length of the regular interval may vary based upon the type of each smart device 210 and the operational state of each smart device 210.

After receiving the operating data from the plurality of smart devices 210, the smart home controller 220 may analyze the received data to determine (254) whether a broken circuit is present on the property. The presence of the broken circuit may be indicative of the flow of electricity to one or more of the plurality of smart devices 210 being cut off. For example, the smart home controller 220 may detect an electrical signal transmitted by a smart circuit monitor in response to the smart circuit monitor detecting a ground fault. As another example, the smart home controller 220 may determine that operating data transmitted at a regular interval did not arrive as scheduled for a portion of the plurality of smart devices 210 disposed within the same area of the property 205. In yet another example, the smart home controller 220 may analyze received audio data to detect an audio pattern indicative of the breaking of a circuit. Of course, the smart home controller 220 may analyze any received data to determine the presence of a broken circuit on the property 205.

If the smart home controller 220 analyzes the received operating data and determines that a broken circuit does not currently exist on the property 205 ("NO"), processing may return to the beginning of the signal diagram 200 where the smart home controller 220 may await new operating data from the plurality of smart devices 210. In contrast, if the smart home controller 220 determines that there is a broken circuit on the property 205 ("YES"), the smart home controller 220 may determine (258) a location of the broken circuit. In some embodiments, the smart home controller 220 may determine the location of the broken circuit by analyzing the source of the operating data that indicated the presence of the broken circuit. For example, if the operating data that indicated the presence of the broken circuit originated from a particular smart circuit monitor, then the smart home controller 220 may query the inventory list 222 to determine the location of the smart circuit monitor. In this example, if the inventory list 222 indicates that the particular smart circuit monitor is located in the master bathroom, the smart home controller 220 may then determine that the broken circuit is also located in the master bathroom. It should be appreciated, that in some scenarios, the smart home controller 220 may determine a specific outlet and/or other power source within a room impacted by the broken circuit.

Upon determining the location of the broken circuit, the smart home controller 220 may then compare (262) the determined location of the broken circuit to the inventory list 222. In particular, the smart home controller 220 may analyze location data associated with the plurality of devices 210 within the inventory list 222 to identify a set of smart devices that are proximate to the location of the broken circuit and/or are powered by electrical components proximate to the location of the broken circuit. In some embodiments, the smart home controller 220 may verify that a smart device is de-energized prior to including the smart device within the set of smart devices. For example, upon determining that the smart device is located proximate to the broken circuit, the smart home controller 220 may monitor a local network (such as the local network 115 as described with respect to FIG. 1) for operating data typically transmitted by the smart device at a regular interval. If the smart home controller 220 determined that the smart device failed to transmit such regularly transmitted data for one or more consecutive intervals, the smart home controller 220 may then determine that the smart device is impacted by the broken circuit. As a result, the smart home controller 220 may include the smart device in the set of smart devices. Conversely, if the smart home controller 220 still received the regularly transmitted operating data from the smart device, then the smart home controller 220 may determine that the smart device is not impacted by the broken circuit. As a result, the smart home controller 220 may exclude the smart device from the set of smart devices.

After the smart home controller 220 identifies the set of smart devices, the smart home controller 220 may generate (266) at least one instruction to mitigate risks associated with the broken circuit. For example, the property may include a smart generator capable of supplying power to the set of smart devices via an electrical path that circumvents and/or otherwise avoids the broken circuit. Accordingly, the at least one instruction may include a command to power on the smart generator. In some embodiments, a smart electric vehicle may function as a smart power generator to power the set of smart devices. Similarly, the smart home controller 220 may determine that power may be re-routed to the set of smart devices via an alternative power source and/or electrical path. To this end, the inventory list 222 may include a mapping of electrical wiring associated with the property 205 and/or a plurality of electrical switches associated therewith. Accordingly, the smart home controller 220 may determine that altering the state of an electrical switch may restore power to the set of smart devices despite the presence of the broken circuit. In this scenario, the smart home controller 220 may generate an instruction to effect the alteration to the state of the electrical switch. As will be explained in further detail below, the smart home controller 220 may additionally or alternatively generate an instruction to re-close the broken circuit.

Once the smart home controller 220 generates the at least one instruction, the smart home controller 220 may transmit (270) the at least one instruction via the local network to cause the plurality of smart devices 210 to execute (274) the at least one instruction. To this end, an instruction may include an identity of a particular smart device of the plurality of smart devices 210 that the smart home controller 220 intends to perform the actions associated with an instruction. The instruction may also include an action code associated with the particular functionality of the particular smart device. Accordingly, the particular smart device may monitor the local network to determine whether the smart home controller 220 has transmitted an instruction that identifies the particular smart device 210. If the particular smart device is identified in a transmitted instruction, the particular smart device may further analyze the instruction to determine the action code indicated therein. As an example, a smart generator may be identified as device abc123 and an action code of "PowerOn" may cause the smart generator to power on. Accordingly, if the smart generator detects an instruction transmitted over the local network containing an instruction that device abc123 should perform the action "PowerOn," the smart generator may begin powering on. In some embodiments, the particular smart device may transmit, via the local network, a confirmation that the particular smart device has successfully executed the instruction.

In addition to transmitting at least one instruction, the smart home controller 220 may also communicate (278) a notification to the electronic device associated with the individual 240 and/or the processing server 235 via a second and/or remote network (such as the remote network(s) 125 as described with respect to FIG. 1). The notification may include information describing the broken circuit, such as where the determined location of the broken circuit, an identity of one or more of the set of devices affected by the broken circuit, a description of any actions associated with the at least one instruction, and/or other information relating to the broken circuit. After receiving the notification, the electronic device may display any information contained therein. In some embodiments, this may include displaying a visual interface that depicts the information in on a display component.

According to embodiments, the processing server 235 may perform (282) an insurance related action in response to receiving the notification. The insurance-related action may include, for example, updating an insurance policy or premium associated with the individual 250 and/or property 205, adjusting an insurance discount or award, processing an insurance claim, and/or recommending the purchase of at least one additional device or insurance product. It should be appreciated that signal diagram 200 may include additional, fewer, and/or alternative actions, including those discussed elsewhere herein. To this end, in some embodiments, some of the actions described with respect to the smart home controller 220 may be alternatively performed by the processing server 235, and vice versa.

Figure 3:
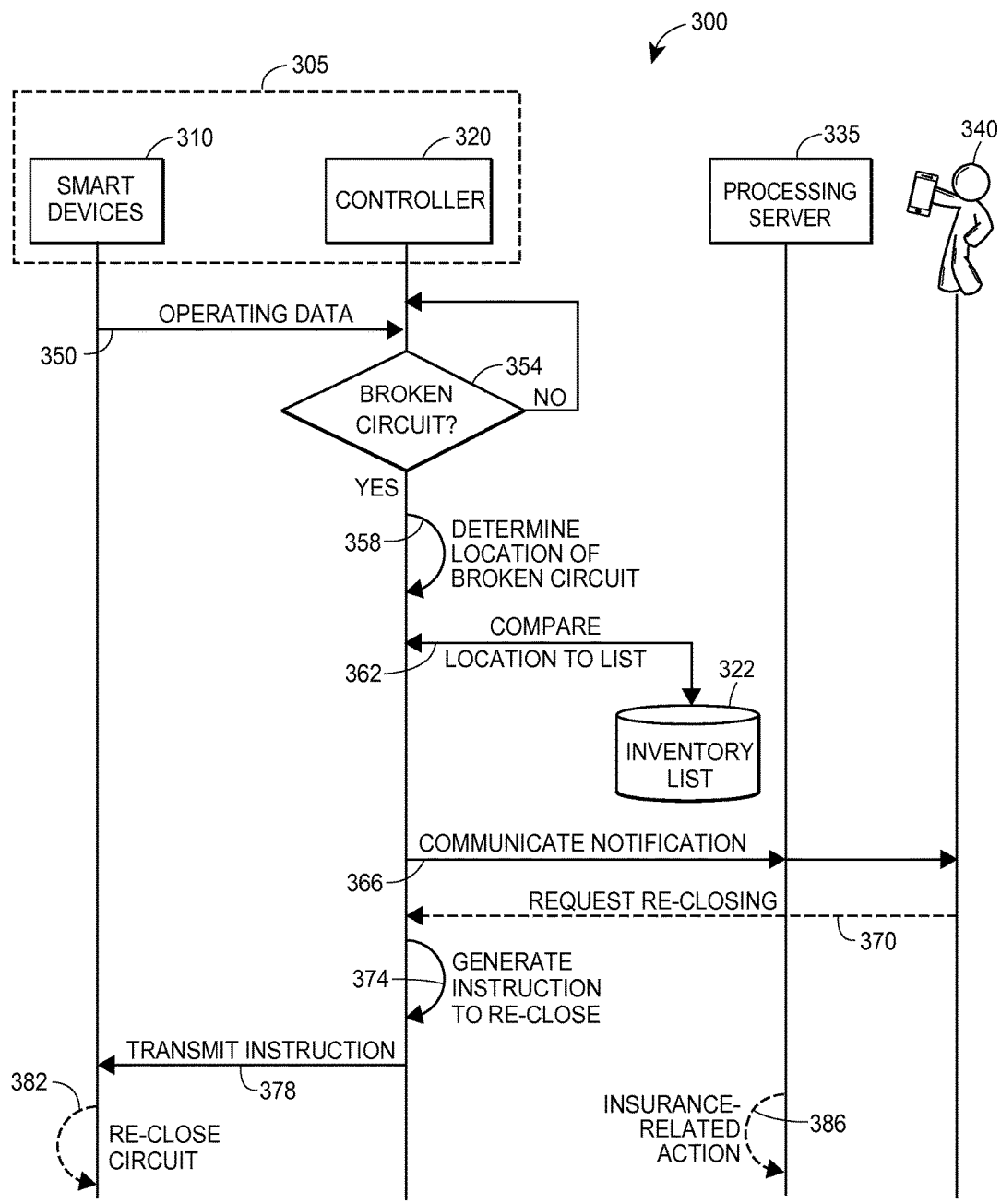
FIG. 3 depicts an exemplary signal diagram associated with re-closing a breaker tripped in response to an unsafe electrical condition, in accordance with some embodiments

Turning now to FIG. 3, illustrated is a signal diagram 300 associated with re-closing a breaker tripped in response to an unsafe electrical condition. In particular, FIG. 3 may include a plurality of smart devices 310 (such as the plurality of smart devices 110 as described with respect to FIG. 1, or a smart office building controller, or even a smart ship controller) disposed on a property 305, a smart home controller 320 (such as the smart home controller 120 as described with respect to FIG. 1), a processing server 335 (such as the processing server 135 as described with respect to FIG. 1), and/or an individual 340 (such as the homeowner 140 as described with respect to FIG. 1) associated with an electronic device. In some embodiments, the smart home controller 320 may be coupled to a database 222 that stores an inventory list (such as the inventory list 122 as described with respect to FIG. 1). It should be appreciated that the electronic device may be any electronic device (e.g., a smartphone, a desktop computer, a laptop, a tablet, phablet, netbook, notebook, a smart watch, smart glasses, smart contact lenses, wearable electronics device, other mobile device, etc.).

As it is generally used herein, to "re-close" a circuit refers to the act of closing a broken circuit. For example, in a conventional home, a circuit may be closed by toggling a switch in a circuit breaker box. Conversely, in the disclosed systems and methods, a smart circuit breaker box may be capable of receiving remote instructions to automatically close a tripped circuit breaker. Accordingly, the smart home controller 320 may "re-close" a tripped circuit breaker within a smart circuit breaker box by generating and transmitting an instruction to the smart circuit breaker box via a local network (such as the local network 115 as described with respect to FIG. 1). It should be appreciated that while the physical means to effect the re-closing of the broken circuit may vary between smart circuit monitoring devices, each smart circuit monitoring device may be capable of interpreting remote instructions to cause a respective physical means indicated by the instruction to re-close a corresponding circuit.

The signal diagram 300 may begin when the plurality of smart devices 310 transmit (350) operating data to the smart home controller 320 (or other types of controllers, including those discussed elsewhere herein). The smart home controller 320 may then determine (354) whether the operating data indicates the presence of a broken circuit on the property 305. If operating data does indicate the presence of a broken circuit ("YES"), the smart home controller 320 may then determine (362) a location of the broken circuit and compare the location to the inventory list 322 to identify a set of smart devices affected by the broken circuit. Conversely, if the smart home controller 320 determines that the operating data does not indicate the presence of a broken circuit ("NO"), processing may return to the beginning of the signal diagram 300 where the smart home controller 320 awaits further operating data. It should be appreciated that the actions associated with steps 350-362 of the signal diagram 300 may be performed in substantially the same manner as the steps 250-262 of the signal diagram 200.

After generating the set of devices affected by the broken circuit, the smart home controller 320 may then generate and communicate (366) a notification to the electronic device associated with the individual 340 and/or the processing server 335. The notification may include information describing the broken circuit, such as the determined location of the broken circuit, an identity of one or more of the set of devices affected by the broken circuit, and/or other information relating to the broken circuit. After receiving the notification, the electronic device may display an interface that enables the individual 340 to generate a request to re-close the broken circuit. To this end, the interface may include a soft button that, when selected by the individual 340, causes the electronic device to transmit (370), to the smart home controller 320, the request to re-close the broken circuit.

Upon receiving the request to re-close the broken circuit, the smart home controller 320 may generate (374) an instruction to re-close the broken circuit. In embodiments in which the smart circuit monitor associated with the broken circuit contains a plurality of circuit breakers, the generated instruction may identify a specific circuit breaker to re-close. Similarly, if the smart circuit monitor is associated with multiple broken circuits, the generated instruction may include a command to re-close all circuit breakers. It should be appreciated that in some embodiments, the smart home controller 320 may determine that there is a significant risk of damage to the property 305 if the broken circuit is not re-closed. For example, the smart home controller 320 may determine that a sump pump is no longer energized as a result of the broken circuit. If the smart home controller 320 also determines that rainfall is present and/or will likely be present on the property 305, there may be a significant risk of flooding damage to the property 305. Accordingly, the smart home controller 320 may, in some embodiments, generate the instruction to re-close the broken circuit without first receiving the request from the electronic device associated with the individual 340.

Regardless of what triggered the smart home controller 320 to generate the instruction, once the instruction is generated, the smart home controller 320 may then transmit (378) the instruction to re-close the broken circuit to the plurality of smart devices 310. The instruction to re-close the broken circuit may cause a smart circuit monitor within the plurality of smart devices 210 to re-close (382) the broken circuit. To this end, the instruction may include an identity of the smart circuit monitor and/or an action code associated with the re-closing the broken circuit. Accordingly, the smart circuit monitor may monitor the local network to determine whether the smart home controller 320 has transmitted an instruction that identifies the smart circuit monitor. If the smart circuit monitor is identified by the transmitted instruction, the smart circuit monitor may further analyze the instruction to determine the action code indicated therein (which, in this example, represents a request to re-close a circuit). Accordingly, the smart circuit monitor may interpret the action code and cause the indicated circuit to re-close. In some embodiments, the smart circuit monitor may transmit, via the local network, a confirmation that the smart circuit monitor has successfully re-closed the circuit.

According to embodiments, the processing server 335 may perform (386) an insurance related action in response to receiving the notification. The insurance-related action may include, for example, updating an insurance policy or premium associated with the individual 350 and/or property 305, adjusting an insurance discount or award, processing an insurance claim, and/or recommending the purchase of at least one additional device or insurance product. In one embodiment, an insurance premium or discount may be updated based upon an insured's home being equipped with the functionality and/or risk mitigation features discussed herein. It should be appreciated that signal diagram 300 may include additional, fewer, and/or alternative actions, including those discussed elsewhere herein. To this end, in some embodiments, some of the actions described with respect to the smart home controller 320 may be alternatively performed by the processing server 335, and vice versa.

III. Exemplary User Interfaces for Responding to Broken Circuit

Figure 4:
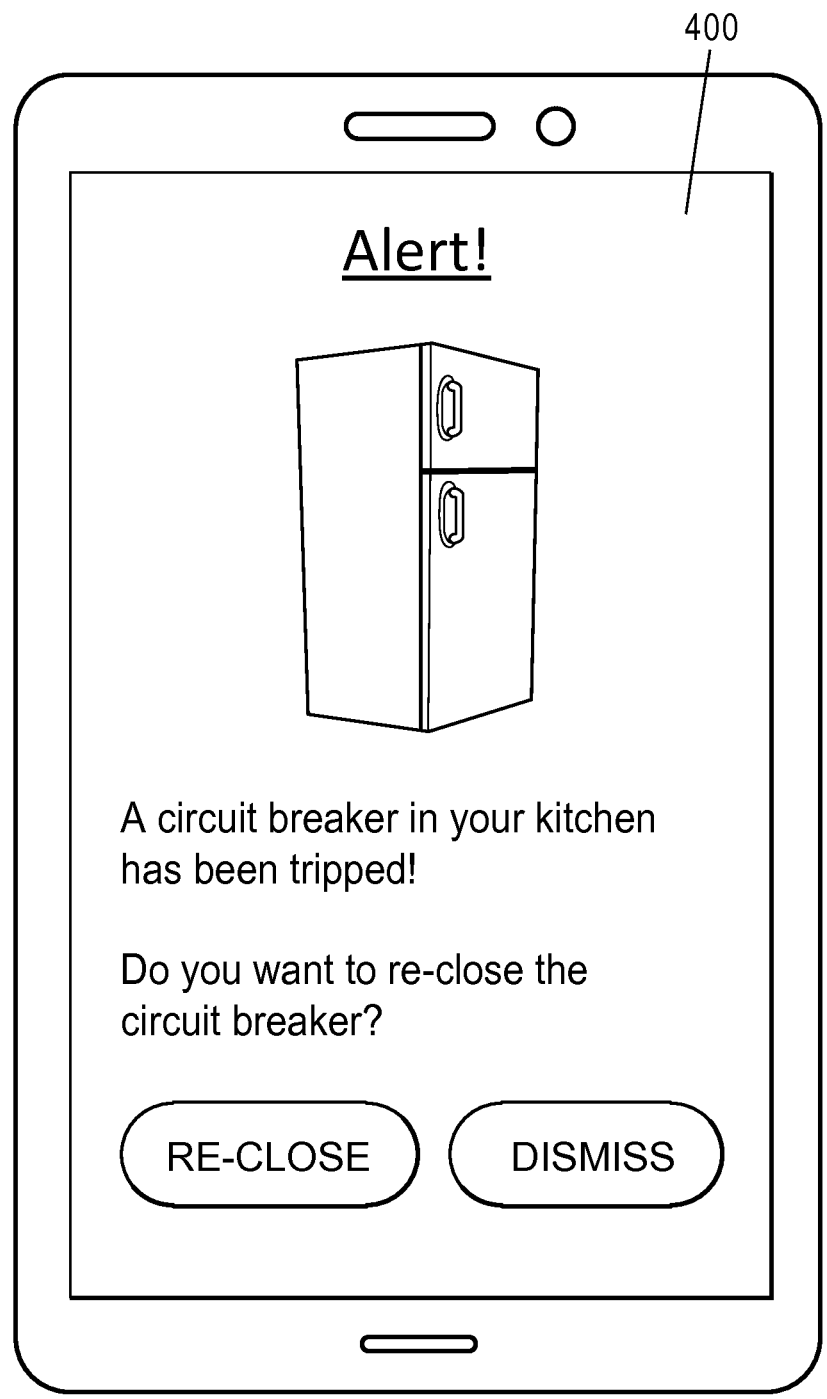
FIG. 4 depicts an exemplary interface associated with alerting a customer to the presence of a broken circuit on a property, in accordance with some embodiments.

FIG. 4 illustrates an exemplary interface 400 associated with alerting a customer to a presence of a broken circuit on a property. An electronic device (e.g., a smartphone or other mobile device) may be configured to display the interfaces and receive selections and inputs via the interfaces. For example, a dedicated application associated with an insurance provider and that may be configured to operate on the electronic device may display the interfaces. It should be appreciated that the interface 400 is merely an example and that alternative or additional content is envisioned.

According to present embodiments, the interface 400 may include information describing a broken circuit. In particular, the interface 400 may indicate that a broken circuit is present on the property, an indication of what caused the broken circuit ("circuit breaker . . . tripped"), where the broken circuit is located on the property ("your kitchen"), an indication of any property impacted by the broken circuit (the image of the refrigerator), and/or other related information. Further, the interface 400 may enable a user to select a desired response to the broken circuit. In particular, the interface 400 may enable the user to select from remotely re-closing the broken circuit and/or taking no action. It should be appreciated that the interface 400 may provide additional and/or alternative options from which the user may select. According to embodiments, if the user selects the interface element to re-close the broken circuit, the electronic device may transmit a request to re-close the broken circuit. Additionally, if the user selects the interface element to take no action, an insurance provider associated with the user may perform an insurance-related action to account for the user's inaction. The exemplary interface 400 may include additional, less, or alternate functionality, including functionality described elsewhere herein.

IV. Exemplary Method of Responding to a Broken Circuit

Figure 5:
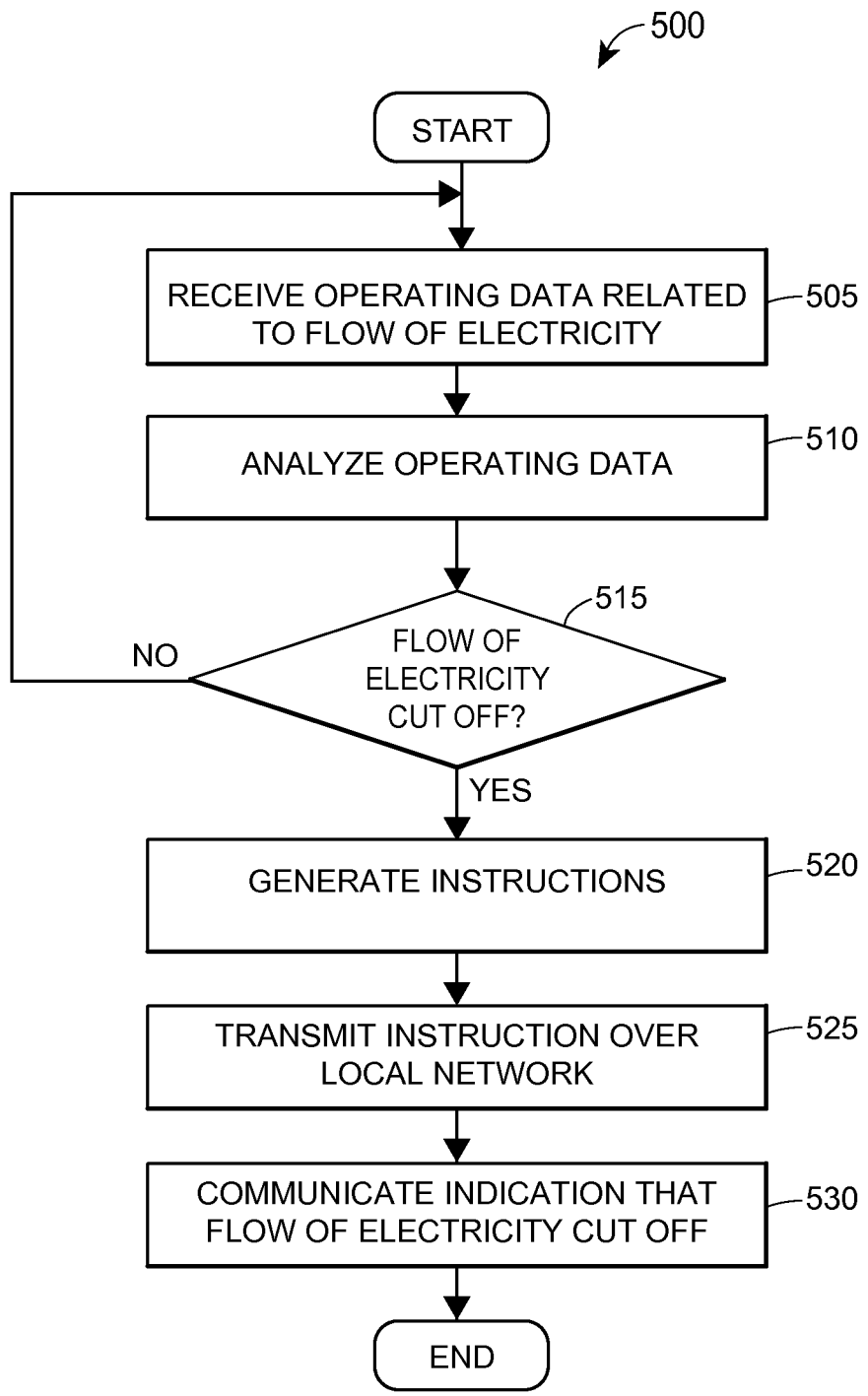
FIG. 5 depicts an exemplary flow diagram associated with generating a response to detecting a broken circuit on a property, in accordance with some embodiments.

Referring to FIG. 5, depicted is a block diagram of an exemplary method 500 of generating a response to a broken circuit on a property. The method 500 may be facilitated by a hardware (e.g., "smart home") controller within the property, such as one of the smart home controllers 120, 220, or 320, that may be in direct or indirect communication with an plurality of smart devices (such as one of the pluralities of smart devices 110, 210, or 310).

The method 500 may begin when the controller receives (block 505) operating data related to the flow of electricity on the property from the plurality of devices disposed on the property. In particular, the plurality of devices may include a circuit monitoring device that transmits data indicative of the flow of electricity through monitored circuits. For example, the circuit monitoring device may be, inter alia, a circuit breaker or a ground fault circuit interrupter (GFCI). To this end, the circuit monitoring device may periodically transmit operating data indicating that electricity is flowing throw the monitored circuit (i.e., the monitored circuit is closed). Similarly, the circuit monitoring device may also transmit operating data that electricity is not flowing through the monitored circuit (i.e., the monitored circuit is broken).

Upon receiving the operating data, the hardware controller may analyze (block 510) the operating to determine (decision 515) whether the flow of electricity to a circuit on the property has been cut off. In one aspect, the hardware controller may determine that the flow of electricity has been cut off by detecting that a circuit monitoring device transmitted operating data indicating that a monitored circuit has been broken (i.e., the circuit monitoring device was tripped). The hardware controller may additionally or alternatively determine whether the flow of electricity was cut off using any technique discussed elsewhere herein. When the analysis conducted by the hardware controller indicates that the flow of electricity through a monitored circuit has not been cut off ("NO"), the method 500 may await the reception of addition electrical flow data.

Conversely, when the analysis conducted by the hardware controller indicates that the flow of electricity through a monitored circuit has been cut off ("YES"), the hardware controller may then generate (block 520) an instruction to prevent and/or mitigate damage associated with the flow of electricity being cut off. To this end, the hardware controller may determine a location and/or a set of devices no longer receiving electricity due to the electrical flow being cut off. Accordingly, the instruction may cause the flow of electricity and/or supply of power to the determined location and/or set of devices to be re-routed from a first source to a second source capable of supplying electricity and/or power to the location and/or set of device via an alternative electrical path. In embodiments in which the circuit monitoring device is capable of automatically re-closing the broken circuit (thereby restoring the flow of electricity), the instruction may additionally or alternatively cause the circuit monitoring device to re-close the broken circuit. It should be understood that the hardware controller may generate any number of instructions to mitigate risks associated with the flow of electricity being cut off, including instructions described elsewhere herein.

The hardware controller may then transmit (block 525) any generated instructions over a local network (such as the local network 115 as described with respect to FIG. 1). According to some embodiments, each of the plurality of smart devices may monitor the local network for instructions transmitted by the hardware controller. If an instruction identifies a particular smart device of the plurality of smart devices, the particular smart device may execute the instruction. To this end, when the particular smart device executes the instruction, the particular smart device may cause the performance of any actions indicated by the instruction.

According to certain aspects, the hardware controller may also generate and communicate (block 530) a notification to an electronic device associated with a homeowner and/or other individual associated with the property. The notification may include various types of information relating to the flow of electricity being cut off. For example, the notification may indicate a location of the broken circuit and/or a set of devices no longer receiving a flow of electricity. The method 500 may include additional, less, or alternate actions, including those discussed elsewhere herein.

V. Exemplary Repeated Broken Circuit Response Communication

Figure 6:
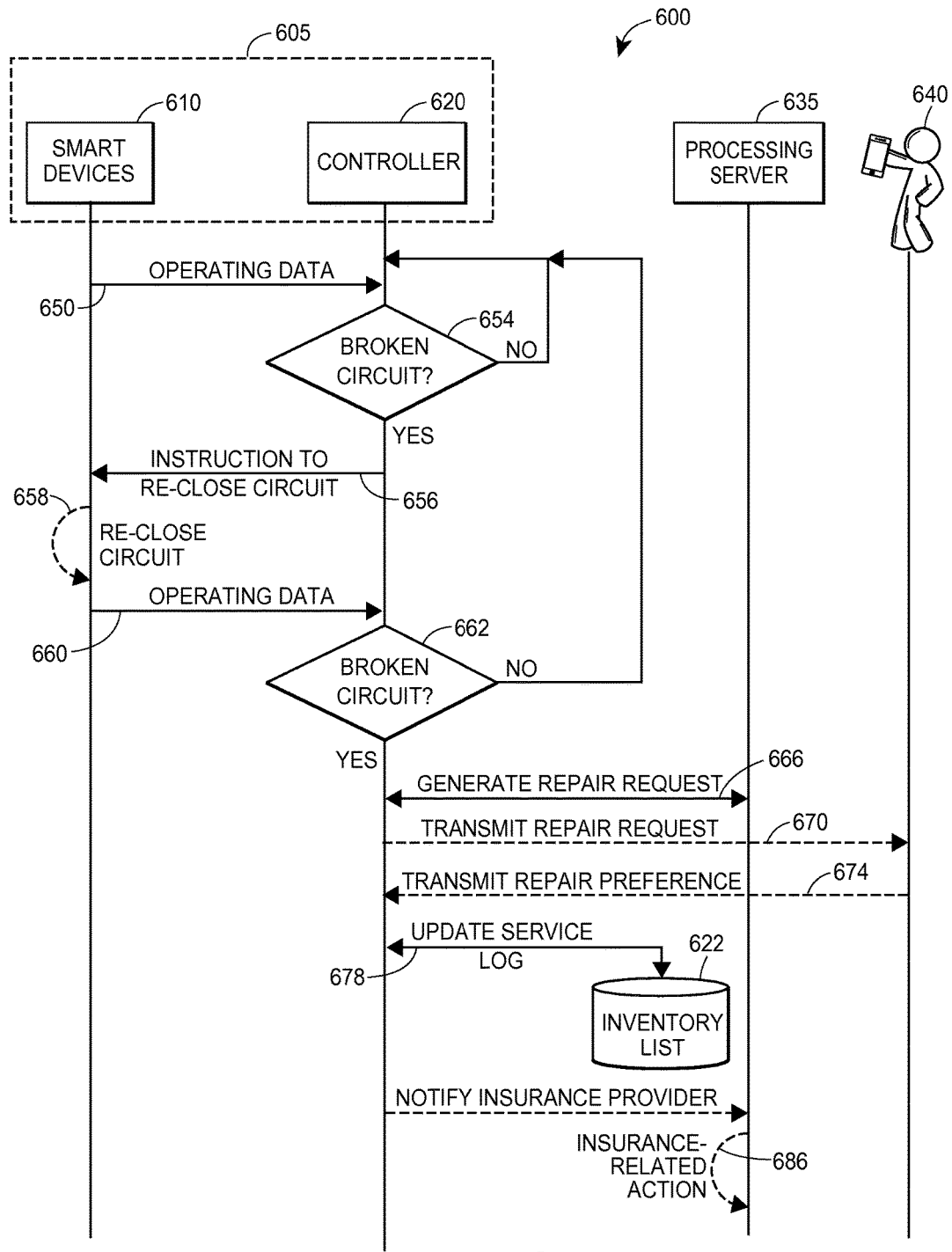
FIG. 6 depicts an exemplary signal diagram associated with responding to a breaker tripped repeatedly in response to an unsafe electrical condition, in accordance with some embodiments

Referring to FIG. 6, illustrated is a signal diagram 600 associated with responding to a breaker tripped repeatedly in response to an unsafe electrical condition. In particular, FIG. 6 may include a plurality of smart devices 610 (such as the plurality of smart devices 110 as described with respect to FIG. 1) disposed on a property 605, a smart home controller 620 (such as the smart home controller 120 as described with respect to FIG. 1, or a smart office building controller, or even a smart ship controller), a processing server 635 (such as the processing server 135 as described with respect to FIG. 1), and/or an individual 640 (such as the homeowner 140 as described with respect to FIG. 1) associated with an electronic device. In some embodiments, the smart home controller 620 may be coupled to a database that stores an inventory list (such as the inventory list 122 as described with respect to FIG. 1). It should be appreciated that the electronic device may be any electronic device (e.g., a smartphone, a desktop computer, a laptop, a tablet, phablet, netbook, notebook, a smart watch, smart glasses, smart contact lenses, wearable electronics device, other mobile device, etc.).

The signal diagram 600 may begin when the plurality of smart devices 610 transmit (650) operating data to the smart home controller 620 (or other types of controllers, including those discussed elsewhere herein). The operating data may be transmitted by performing actions similar to those associated with the step 250 of the signal diagram 200. In response to receiving the operating data, the smart home controlled 620 may analyze the operating data to determine (decision 654) whether there is a broken circuit present on the property 605. To make the determination, the smart home controller 620 may perform substantially similar actions as those associated with the decision 254 of the signal diagram 200.

If the smart home controller 620 determines that a broken circuit is not currently present on the property 605 (the "NO" branch), processing may return to the beginning of the signal diagram 600 to await further operating data. Conversely, if the smart controller 620 determines that there is a broken circuit present on the property 605 (the "YES" branch), the smart home controller 620 may generate and transmit (656) an instruction to automatically re-close the broken circuit. The smart home controller 620 may generate and transmit the instruction by performing actions substantially similar to those associated with the steps 358-378 of the signal diagram 300. In response to transmitting the instruction, a smart circuit monitor of the plurality of smart devices 610 may automatically re-close (658) the broken circuit.

After the broken circuit has been automatically re-closed by the smart circuit monitor, the plurality of smart devices 610 may transmit (660) additional operating data to the smart home controller 620. In response to receiving the additional operating data, the smart home controller 620 may analyze the additional operating data to determine (decision 662) whether the same circuit that was previously broken has been broken again. The smart home controller 620 may begin this determination by performing actions substantially similar as those associated with the decision 654 to determine whether the additional operating data indicate the presence of any broken circuits on the property 605. In some embodiments, the smart home controller 620 may also monitor an amount of time that has elapsed since the decision 654 occurred. In these embodiments, if the monitored amount of time exceeds a threshold amount of time (e.g., 5 seconds, 2 minutes, 30 minutes, 1 day, etc.) and the additional operating data do not indicate the presence of a broken circuit, the processing may return (the "NO" branch) to the beginning of the signal diagram 600.

Additionally, if the additional operating data indicate the presence of a broken circuit within the threshold amount of time, the smart home controller 620 may further analyze the additional operating data to determine that the currently broken circuit is the same broken circuit detected at the decision 654. If the circuit currently broken is not the same circuit that was broken at the decision 654, then processing may return (the "NO" branch) to the beginning of the signal diagram 600 to await new operating data. It should be understood that in this scenario, the next set of operating data received by the smart home controller 620 may likely indicate the presence of the currently broken circuit, thus satisfying the determination at the subsequent decision 654. On the other hand, if the circuit currently broken is the same circuit that was broken at the decision 654, then processing may proceed along the "YES" branch.

In some embodiments, rather than determining whether the currently broken circuit is the same circuit detected at the decision 654, the smart home controller 620 may analyze the additional operating data to determine whether there is an overlap between the sets of devices cut off from a flow of electricity due to each broken circuit. To this end, a bathroom light may be monitored by two circuit monitoring devices (e.g., a GFCI switch in the bathroom and a bathroom circuit breaker located in a fuse box). If the smart home controller 620 detected that the GFCI was the broken circuit at the decision 654 and the bathroom circuit breaker is the circuit currently broken, then processing may still proceed along the "YES" branch.

When processing proceeds along the "YES" branch from the decision 662, the smart home controller 620 may then interface with the processing server 635 to generate (666) a repair request. The repair request may indicate to a repair service provider a need to investigate the electrical condition associated with the broken circuit. As part of generating the repair request, the smart home controller 620 may determine a preferred time for a repair event to occur. For example, the smart home controller 620 may maintain a profile associated with the individual 640. The profile may indicate that the individual 640 prefers repair work to be performed on Saturday mornings. Accordingly, the smart home controller 620 may query the profile to ensure that the requested repair event occurs in accordance to the preferences of the individual 640.

Additionally, as part of generating the repair request, the smart home controller 620 may determine a repair service provider to perform the requested repair. To this end, the insurance provider associated with the processing server 635 may maintain a relationship with a plurality of repair service providers that provide electrical assessment and/or repair. In embodiments where the insurance provider maintains a relationship with multiple repair service providers, the smart home controller 620 may select a repair service provider based upon additional criteria. For example, the smart home controller 620 may exclude repair service providers that are unavailable during the time period preferred by the individual 640. According to some embodiments, the smart home controller 620 may then select a remaining repair service provider associated with the lowest cost of repair/assessment.

In some embodiments, the generated repair request may be a recommended repair request. Accordingly, in these embodiments, the smart home controller 620 may transmit (670) the recommended repair request to the electronic device associated with the individual 640 for approval and/or modification. In response, the electronic device may display an interface that enables the individual 640 to view the generated time, repair service provider identity, cost, and/or other similar information associated with the recommended repair request. The interface may further enable the individual 640 to accept the recommended repair request and/or to modify any of the details associated with the recommended repair request. To this end, the individual 640 may indicate a repair preference by accepting and/or modifying the recommended repair request. Once the individual 640 accepts and/or modifies the recommended repair request, the electronic device may then transmit (674) the accepted and/or modified repair request to the smart home controller 620. In these embodiments, the received repair request indicating a repair preference of the individual 640 may now be the generated repair request.

Regardless if the recommended repair request was transmitted to the electronic device associated with the individual 640, the smart home controller 620 may transmit (not depicted) the generated repair request to the repair service provider indicated in the generated repair request. In response to transmitting the generated repair request to the repair service provider, the smart home controller 620 may receive a confirmation that the repair service provider will perform a repair event in accordance with the repair request. Upon receiving this confirmation, the smart home controller 620 may then update (678) a service log stored in the inventory list 622 to indicate the future scheduled repair event. More particularly, the smart home controller 620 may update an entry to indicate that the device(s) will be the subject of the future scheduled repair event. The updated entry may be associated with the circuit monitoring device and/or any device no longer connected to a flow of electricity due to the broken circuit. According to aspects, updating the service log may include storing a plurality of indications describing the future scheduled repair event (e.g., the time, repair service provider identity, cost, and/or other similar information), including any information contained within the generated repair request itself.

In some further embodiments, the smart home controller 620 may transmit (682) a notification to the processing server 635. The notification may indicate that a broken circuit was detected (i.e., that a flow of electricity through a monitored circuit was cut off) and/or that the future scheduled repair event was scheduled. In response, the processing server 635 may perform (686) an insurance-related action. For example, according to some aspects, the insurance related-action may be any combination of updating an insurance policy or premium, adjusting an insurance discount or award, processing an insurance claim, and/or recommending a purchase of at least one additional device or insurance product.

It should be appreciated that signal diagram 600 may include additional, fewer, and/or alternative actions, including those discussed elsewhere herein. For example, in some embodiments, some of the actions described with respect to the smart home controller 620 may be alternatively performed by the processing server 635 and/or the smart device 610.

VI. Exemplary User Interfaces for Responding to Broken Circuit

Figure 7:
FIG. 7 depicts an exemplary interface associated with alerting a customer to a need to schedule a repair event in response to detecting a broken circuit on a property, in accordance with some embodiments.

FIG. 7 illustrates an exemplary interface 700 associated with alerting a customer to a need to schedule a repair event in response to detecting a broken circuit on a property. An electronic device (e.g., a smartphone or other mobile device) may be configured to display the interfaces and receive selections and inputs via the interfaces. For example, a dedicated application associated with an insurance provider and that may be configured to operate on the electronic device may display the interfaces. It should be appreciated that the interface 700 is merely an example and that alternative or additional content is envisioned.

According to present embodiments, the interface 700 may include information describing a repeatedly broken circuit. In particular, the interface 700 may indicate that a circuit breaker has been tripped and cannot be automatically re-closed. As a result, the interface 700 may additionally provide details describing a recommended repair request to assess and/or investigate the electrical problem. These details may include a name of a repair service provider capable of performing further repairs ("Repair Co."), a time frame when the repair service provider is available to perform the repair event ("Saturday morning"), a cost associated with the repair event ("$115"), and/or other details.

Further, the interface 700 may enable a user to select a desired response to the notification of the broken circuit. In particular, the interface 700 may enable the user to select from accepting and/or hiring the repair service provider indicated by the interface 700, modifying the repair request indicated by the interface 700, and/or taking no action in response to the presence of the repeatedly broken circuit. According to embodiments, if the user selects the interface element to modify the repair request, the electronic device may display another interface that enables the modification of repair requests. Additionally, if the user selects the interface element to take no action, an insurance provider associated with the user may perform an insurance-related action to account for the user's inaction. The exemplary interface 700 may include additional, less, or alternate functionality, including functionality described elsewhere herein.

VII. Exemplary Method of Responding to a Broken Circuit

Figure 8:
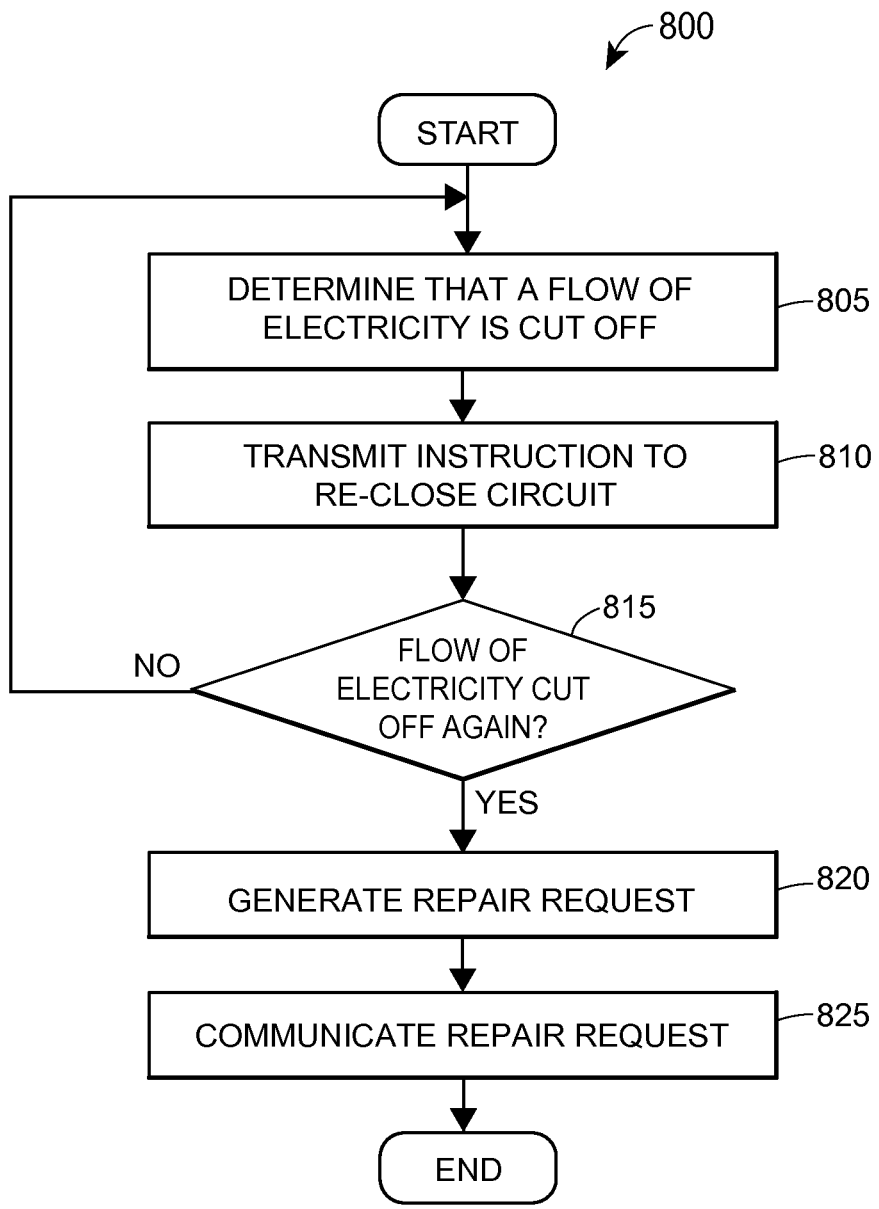
FIG. 8 depicts an exemplary flow diagram associated with generating a response to repeatedly detecting a broken circuit on a property, in accordance with some embodiments.

Referring to FIG. 8, depicted is a block diagram of an exemplary method 800 of generating a response to repeatedly detecting a broken circuit on a property. The method 800 may be facilitated by a hardware (e.g., "smart home") controller within the property, such as one of the smart home controllers 120, 220, or 620, that may be in direct or indirect communication with an plurality of smart devices (such as one of the pluralities of smart devices 110, 210, or 610). The plurality of smart devices may include a circuit monitoring device.

The method 800 may begin when the hardware controller determines (block 805) that the circuit monitoring device has cut off the flow of electricity through a monitored circuit. For example, the circuit monitoring device may be a GFCI or a circuit breaker tasked with monitoring electrical conditions associated with a circuit. When the circuit monitoring device is tripped, the circuit monitoring device may be configured to transmit an indication to the hardware controller informing the hardware controller that the monitored circuit has been broken. Additionally, one or more of the plurality of smart devices may be configured to transmit an indication to the hardware controller in response to being disconnected from the flow of electricity. Further, the hardware controller may receive operating data from a current monitoring device indicating a nominal flow of electricity through a circuit.

In response to the hardware controller determining that the flow of electricity has been cut off, the hardware controller may generate and transmit (block 810) an instruction to re-close the circuit monitored by the circuit monitoring device. The generated instruction may identify the circuit monitoring device and/or a specific circuit that was cut off from the flow of electricity. In response to receiving the instruction, the circuit monitoring device may automatically re-close the monitored circuit.

At a point in time after the circuit monitoring device has re-closed the monitored circuit, the hardware controller may receive additional data indicating that a circuit has been broken within the same property. The hardware controller may analyze this additional data to determine (decision 815) whether the detected broken circuit is the same circuit as the previously broken circuit. If the detected circuit is not the same circuit as the previously broken circuit and/or the detected circuit was broken outside of a threshold time frame from the determination associated with the block 805, the method 800 may return to the start again (the "NO" branch).

Conversely, if the detected circuit is the same circuit as the previously broken circuit (i.e., the circuit monitoring device was tripped twice within the threshold time frame), then the hardware controller may generate (block 820) a repair request. The repair request may identify the monitored circuit and include an indication that monitored circuit is unable to be automatically re-closed and is in need of repair and/or assessment. In some embodiments, the repair request may also include a time preference based upon a customer profile.

After generating the repair request, the hardware controller may communicate (block 825) the repair request to a repair service provider. The repair service provider may be identified based upon a preference in the customer profile and/or contractual relationships between the repair service provider and an insurance provider associated with the property. As a result of communicating the repair request, the repair service provider may reply with a confirmation indicating when a corresponding repair event is scheduled. The hardware controller may then update a service log entry corresponding to the circuit monitoring device to indicate any details relating to the scheduled repair event. The method 800 may include additional, less, or alternate actions, including those discussed elsewhere herein.

VIII. Exemplary Broken Circuit Response Method

In one aspect, a computer-implemented method of repairing damage to a property may be provided. The property may be populated with a plurality of devices, including a circuit monitoring device, associated with the property. The method may comprise, with customer permission or affirmative consent, (1) determining, by one or more processors, that the circuit monitoring device cut off a flow of electricity through a monitored circuit; (2) responsive to the determination, transmitting, via a first wired or wireless communication network to the circuit monitoring device, an instruction to re-close the monitored circuit; (3) subsequent to transmitting the instruction, determining, by the one or more processors, that the circuit monitoring device cut off the flow of electricity through the monitored circuit; (4) responsive to the second determination, generating, by the one or more processors, a repair request, the repair request indicating a need to repair an electrical condition associated with the monitored circuit; and/or (5) communicating, to a repair service provider via a second wired or wireless communication network, the repair request, wherein communicating the repair request causes a repair event to be scheduled. The method may include additional, less, or alternate actions, including those discussed elsewhere herein, and/or may be implemented via one or more local or remote processors (such as smart home controllers, smart office building controllers, smart ship controllers, mobile devices, insurance provider remote servers, etc.) and/or computer-executable instructions stored on non-transitory computer-readable medium or media.

For instance, the method may include updating, by the one or more processors, a service log associated with at least one of the circuit monitoring device or a device of the plurality of devices connected to the monitored circuit. According to some embodiments, the circuit monitoring device may be one of a circuit breaker, a ground fault circuit interrupter (GFCI), an appliance leakage current interrupter (ALCI), a residual-current device (RCD), a safety switch, or an arc-fault circuit interrupter (AFCI).

Generating the repair request may include (1) transmitting, to an electronic device of an individual associated with the property, a recommended repair request, wherein the transmitting may cause the electronic device to display the recommended repair request; (2) receiving, from the electronic device, an indication of a preference of the individual, the preference relating to the repair event; and/or (3) updating, by the one or more processors, the recommended repair request to include the received preference.

Transmitting the recommended repair request may include generating, by the one or more processors, the recommended repair request. The recommended repair request may indicate a recommended repair service provider. The recommended repair service provider may be selected based upon profile data associated with the individual. The repair request may only be generated if the second determination occurs within a threshold amount of time from the first determination.

Determining that the circuit monitoring device cut off the flow of electricity through the monitored circuit may include receiving, from the circuit monitoring device via the first wired or wireless network, an indication that the circuit monitoring device has been tripped.

The method may also include communicating, to an insurance provider associated with the property via the second wired or wireless communication network, an indication of at least one of (i) that the flow of electricity through the monitored circuit was cut off and/or (ii) that the repair event has been scheduled. The communication may causes the performance of an insurance-related action. The insurance-related action may include at least one of (i) an update of an insurance policy or premium, (ii) an adjustment of an insurance discount or award, (iii) a processing of an insurance claim, and/or (iv) a recommendation to purchase at least one additional device or insurance product.

IX. Exemplary Broken Circuit Response System

In one aspect, a system for repairing damage to a property populated with a plurality of devices, including a circuit monitoring device associated with the property may be provided. The system may comprise (i) a plurality of transceivers adapted to communicate data; (ii) a memory adapted to store non-transitory computer executable instructions; and/or (iii) one or more processors adapted to interface with the plurality of transceivers. The one or more processors may be configured to execute the non-transitory computer executable instructions to cause the system to (1) determine, by the one or more processors, that the circuit monitoring device cut off a flow of electricity through a monitored circuit; (2) responsive to the determination, transmit, via the plurality of transceivers to the circuit monitoring device, an instruction to re-close the monitored circuit; (3) subsequent to transmitting the instruction, determine, by the one or more processors, that the circuit monitoring device cut off the flow of electricity through the monitored circuit; (4) responsive to the second determination, generate, by the one or more processors, a repair request, the repair request indicating a need to repair an electrical condition associated with the monitored circuit; and/or (5) communicate, to a repair service provider via the plurality of transceivers, the repair request, wherein communicating the repair request causes a repair event to be scheduled.

For instance, to generate the repair request, the one or more processors may be configured to execute the non-transitory computer executable instructions to cause the system to (1) transmit, to an electronic device of an individual associated with the property, a recommended repair request, wherein the transmitting may cause the electronic device to display the recommended repair request; (2) receive, from the electronic device, an indication of a preference of the individual, the preference relating to the repair event; and/or (3) update, by the one or more processors, the recommended repair request to include the received preference.

To transmit the recommended repair request, the one or more processors may be configured to execute the non-transitory computer executable instructions to cause the system to generate, by the one or more processors, the recommended repair request. The recommended repair request may indicate a recommended repair service provider. The recommended repair service provider may be selected based upon profile data associated with the individual. The repair request may be generated only if the second determination occurs within a threshold amount of time from the first determination.

To cause the repair event to be scheduled, the one or more processors may be configured to execute the non-transitory computer executable instructions to cause the system to update, by the one or more processors, a service log associated with at least one of the circuit monitoring device and/or a device of the plurality of devices connected to the monitored circuit.

To determine that the circuit monitoring device cut off the flow of electricity through the monitored circuit, the one or more processors may be configured to execute the non-transitory computer executable instructions to cause the system to receive, from the circuit monitoring device via the plurality of transceivers, an indication that the circuit monitoring device has been tripped.

The one or more processors are may be configured to execute the non-transitory computer executable instructions to cause the system to communicate, to an insurance provider associated with the property via the plurality of transceivers, an indication of at least one of (i) that the flow of electricity through the monitored circuit was cut off and/or (ii) that the repair event has been scheduled.

X. Exemplary Storage Medium for a Broken Circuit Response

In one aspect, a non-transitory computer-readable storage medium storing processor-executable instructions may be provided. When executed, the instructions may cause one or more processors to (1) determine, by the one or more processors, that the circuit monitoring device cut off a flow of electricity through a monitored circuit; (2) responsive to the determination, transmit, via a first wired or wireless communication network to the circuit monitoring device, an instruction to re-close the monitored circuit; (3) subsequent to transmitting the instruction, determine, by the one or more processors, that the circuit monitoring device cut off the flow of electricity through the monitored circuit; (4) responsive to the second determination, generate, by the one or more processors, a repair request, the repair request indicating a need to repair an electrical condition associated with the monitored circuit; and/or (5) communicate, to a repair service provider via the first wired or wireless communication network, the repair request, wherein communicating the repair request causes a repair event to be scheduled. The instructions may cause additional, less, or alternate actions, including those discussed elsewhere herein.

To generate the repair request, the processor-executable instruction, when executed, may cause the one or more processors to (1) transmit, to an electronic device of an individual associated with the property, a recommended repair request, wherein the transmitting may cause the electronic device to display the recommended repair request; (2) receive, from the electronic device, an indication of a preference of the individual, the preference relating to the repair event; and/or (3) update, by the one or more processors, the recommended repair request to include the received preference.

To cause the repair event to be scheduled, the processor-executable instruction, when executed, may cause the one or more processors to update, by the one or more processors, a service log associated with at least one of the circuit monitoring device and/or a device of the plurality of devices connected to the monitored circuit.

XI. Exemplary Smart Home Controller

Figure 9:
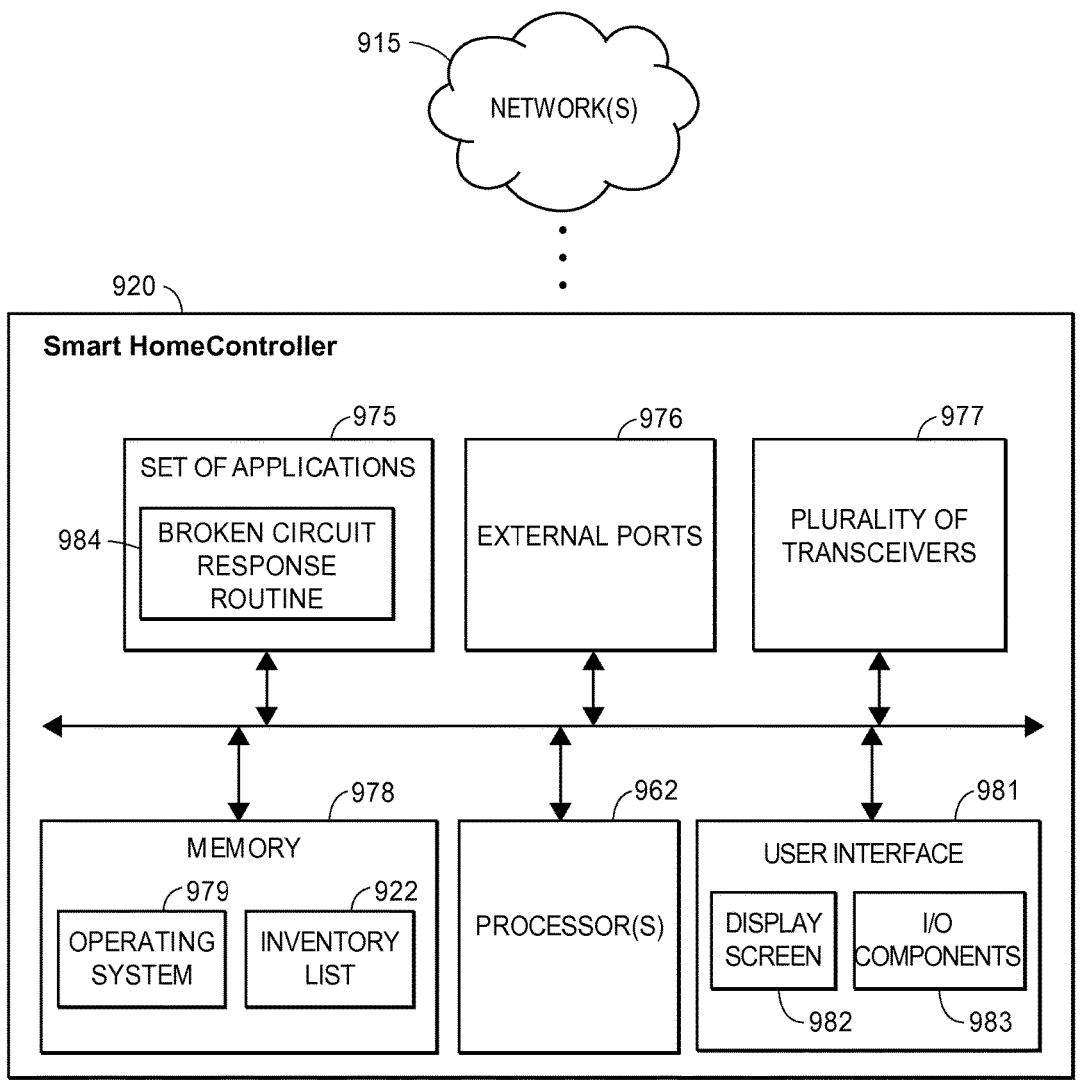
FIG. 9 depicts a block diagram of an exemplary smart home controller, in accordance with some embodiments.

FIG. 9 illustrates a diagram of an exemplary smart home controller 920 (such as the smart home controller 120 as discussed with respect to FIG. 1) in which the functionalities as discussed herein may be implemented. It should be appreciated that the smart home controller 920 may be associated with a property, as discussed herein.

The smart home controller 920 may include a processor 962, as well as a memory 978. The memory 978 may store an operating system 979 capable of facilitating the functionalities as described herein. The smart home controller 920 may also store a set of applications 975 (i.e., machine readable instructions). For example, one application of the set of applications 975 may be a broken circuit response routine 984 configured to cause a plurality of smart devices to perform actions that mitigate the risks associated with the presence of a broken circuit on the property. It should be appreciated that other applications may be included in the set of application 975.

The processor 962 may interface with the memory 978 to execute the operating system 979 and the set of applications 975. According to some embodiments, the memory 978 may also include an inventory list 922 that includes information related to the plurality of smart devices disposed on the premises of the property. The inventory list 922 may also include a service log indicating a maintenance history associated with any number of the plurality of devices. The broken circuit response routine 984 may access the inventory list 922 to determine a location of the broken circuit and/or to determine an appropriate response to the detecting the presence of the broken circuit. The memory 978 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The smart home controller 920 may further include a plurality of transceivers 977 configured to communicate data via one or more networks 915. Network(s) 915 may include both a local network for communicating between devices mounted on, or proximate to, the property and a remote network for communicating between the property and external parties. According to some embodiments, the plurality of transceivers 977 may include one or more transceivers (e.g., WWAN, WLAN, and/or WPAN transceivers) functioning in accordance with IEEE standards, 3GPP standards, or other standards, and configured to receive and transmit data via one or more external ports 676. In some embodiments, the plurality of transceivers 977 may include separate transceivers configured to interact with the local and remote networks separately. The smart home controller 920 may further include a user interface 981 configured to present information to a user and/or receive inputs from the user. As shown in FIG. 9, the user interface 981 may include a display screen 982 and I/O components 983 (e.g., ports, capacitive or resistive touch sensitive input panels, keys, buttons, lights, LEDs, speakers, microphones).

According to the present embodiments, the user may access the smart home controller 920 via the user interface 981 to monitor the status of the plurality of smart devices associated with a property, control the plurality of smart devices associated with the property, indicate a broken circuit response, and/or perform other functions. In some embodiments, the smart home controller 920 may perform the functionalities as discussed herein as part of a "cloud" network, or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 962 (e.g., working in connection with the operating system 979) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

XII. Additional Embodiments

The present embodiments may relate to, inter alia, managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, ships, planes, vehicles, and/or other types of properties.

The central controller, and/or one or more remote processors or servers associated with an insurance provider, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or insurance provider remote processor(s), may collect or retrieve various data from the devices or personal property, analyze the data, and/or identify various actions to facilitate based upon the analysis. In particular, the central controller, and/or insurance provider remote processor(s), may issue commands to the devices or otherwise control operation of the devices. Upon receipt, the appropriate device may execute the command(s) to cause the smart device to perform an action or enter a preferred operation state. The central controller, and/or insurance provider remote processor(s), may also generate notifications of various operation states or completed actions, and communicate the notifications to individuals associated with the property.

Generally, the systems and methods offer numerous benefits to operation of devices within the property, as well as to individuals associated with the property. In particular, the systems and methods may automatically detect potential or actual issues with the property that the individuals may not realize exist, and may automatically facilitate preventative or corrective actions to address the issues. As a result, security associated with the property may improve. Further, the systems and methods improve loss prevention and mitigate actual loss. The systems and methods further apply to independent and/or assisted living situations, whereby patients may receive improved care and individuals associated with the patients may realize more effective communication. Additionally, the systems and methods may improve energy consumption.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The smart home controller or remote processor may automatically direct or control (i) opening (and/or unlocking) smart windows and/or smart doors, and/or (ii) lighting up an evacuation path (e.g., remotely operating smart lighting or lamps) when a fire event is detected within the insured home by the smart home controller or remote processor to facilitate occupants evacuating the insured home during the fire event. Additionally or alternatively, the smart home controller or remote processor may automatically direct or control (i) lighting up an evacuation path (e.g., remotely operating smart lighting or lamps) and/or (2) deploying evacuation equipment (e.g., rope or ladder deployment) when a fire event is detected within the insured home by the smart home controller or remote processor to facilitate occupants evacuating the insured home during the fire event.

The insured home may have smart doors that include smart hinges. The smart hinges may be configured to (1) automatically open when a fire event is detected within the insured home by the smart home controller or remote processor, and (2) it is determined by the smart home controller or remote processor that the insured home is occupied to facilitate occupant evacuation. Additionally or alternatively, the smart hinges may be configured to (3) automatically close when a fire event is detected within the insured home by the smart home controller or remote processor, and (4) it is determined by the smart home controller or remote processor that the insured home is unoccupied to facilitate fire suppression.

In some embodiments, data from one of the smart devices may cause certain actions for another of the devices. For instance, if a smoke alarm triggers, then hinges (e.g., smart hinges) on a set of interior doors may cause the set of interior doors to close.

The insured home may have smart doors that include smart door knobs. The smart door knobs may be configured to change color or glow when a fire event is detected to facilitate insured home occupants finding doors within smoke-filled rooms or homes. Additionally or alternatively, the smart door knobs may be configured to change color or glow when a fire event is detected (such as by a heat sensor integrated with the smart door knob) to indicate that there is a fire, or potential fire, on the other side of the smart door.

XIII. Additional Considerations

As used herein, the term "smart" may refer to devices, sensors or appliances located inside or proximate to a property with the ability to remotely communicate information about the status of the device, sensor, or appliance and/or receive instructions that control the operation of the device, sensor, or appliance. For example, a smart thermostat may be able to remotely communicate the current temperature of the home and receive instructions to adjust the temperature to a new level. As another example, a smart water tank may be able to remotely communicate the level water contained therein and receive instructions to restrict the flow of water leaving the tank. In contrast, "dumb" devices, sensors, or appliances located inside or proximate to a property require manual control. Referring again to the thermostat example, to adjust the temperature on a "dumb" thermostat, a person would have to manually interact with the thermostat. As such, a person may be unable to use a communication network to remotely adjust a "dumb" device, sensor, or appliance.

For simplicity's sake, a "smart device" shall be used herein to refer to any of a smart device, sensor, appliance, and/or other smart equipment that may be disposed on or proximate to a property. In embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. An individual associated with the property shall be referred to as the "homeowner," but it is also envisioned that the individual is a family member of the homeowner, a person renting/subletting the property, a person living or working on the property, a neighbor of the property, an insured, or any other individual that may have an interest in preventing or mitigating damage to the property.

Further, any reference to "home" is meant to be exemplary and not limiting. The systems and methods described herein may be applied to any property, such as offices, farms, lots, parks, and/or other types of properties or buildings. Accordingly, "homeowner" may be used interchangeably with "property owner." As used herein, "property" may also refer to any buildings, belongings and/or equipment disposed on the property itself.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or risk of damage mitigating functionality discussed herein), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits or risk mitigating recommendations to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

It should be understood that the smart devices may be considered specific-purpose computers designed to perform specific tasks. For example, a smart window may comprise a processor specifically configured to monitor one or more networks for remotely-generated instructions to cause the smart window to open and/or close. The processor may additionally be specifically programmed to interpret the instructions to generate another instruction to cause a motor component corresponding to the smart window to physically open and/or close the smart window. In addition to the execution of instructions, the processor may also be specifically configured to monitor conditions associated with the smart window and to transmit the conditions via one or more networks. To this end, the processor corresponding to a smart device may be configured solely to perform specific actions indicated by received instructions and to communicate specific conditions associated with the smart device. Accordingly, the processor corresponding to the smart device may not be configurable to perform additional and/or alternative general-purpose functions typically associated with general-purpose computers. It should be understood that since the present application contemplates a variety of different smart devices, the specific-purpose of each processor may vary between and among the smart devices.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of repairing damage to a property populated with a plurality of devices, including a circuit monitoring device, associated with the property, the method comprising:
    determining, by one or more processors of a home controller disposed on the property, that the circuit monitoring device cut off a flow of electricity through a monitored circuit;
    responsive to the determination, transmitting, from the home controller via a first wired or wireless communication network to the circuit monitoring device, an instruction to re-close the monitored circuit, wherein the instruction is formatted such that the circuit monitoring device re-closes the monitored circuit upon receipt of the instruction;
    subsequent to transmitting the instruction, determining, by the one or more processors, that the circuit monitoring device cut off the flow of electricity through the monitored circuit within a threshold amount of time since the first determination;
    responsive to the second determination, generating, by the one or more processors, a repair request, the repair request indicating a need to repair an electrical condition associated with the monitored circuit; and
    communicating, to a repair service provider via a second wired or wireless communication network, the repair request, wherein communicating the repair request causes a repair event to be scheduled.

2. The computer-implemented method of claim 1, wherein the circuit monitoring device is one of a circuit breaker, a ground fault circuit interrupter (GFCI), an appliance leakage current interrupter (ALCI), a residual-current device (RCD), a safety switch, or an arc-fault circuit interrupter (AFCI).

3. The computer-implemented method of claim 1, wherein generating the repair request further comprises:
    transmitting, to an electronic device of an individual associated with the property, a recommended repair request, wherein the transmitting causes the electronic device to display the recommended repair request;
    receiving, from the electronic device, an indication of a preference of the individual, the preference relating to the repair event; and
    updating, by the one or more processors, the recommended repair request to include the received preference.

4. The computer-implemented method of claim 3, wherein transmitting the recommended repair request further comprises:
    generating, by the one or more processors, the recommended repair request, the recommended repair request indicating a recommended repair service provider, wherein the recommended repair service provider is selected based upon profile data associated with the individual.

5. The computer-implemented method of claim 1, wherein causing the repair event to be scheduled further comprises:
    updating, by the one or more processors, a service log associated with at least one of the circuit monitoring device or a device of the plurality of devices connected to the monitored circuit.

6. The computer-implemented method of claim 1, wherein determining that the circuit monitoring device cut off the flow of electricity through the monitored circuit further comprises:
    receiving, from the circuit monitoring device via the first wired or wireless network, an indication that the circuit monitoring device has been tripped.

7. The computer-implemented method of claim 1, wherein generating the repair request further comprises:
    generating, by the one or more processors, the repair request only if the second determination occurs within a threshold amount of time from the first determination.

8. The computer-implemented method of claim 1, further comprising:
    communicating, to an insurance provider associated with the property via the second wired or wireless communication network, an indication of at least one of (i) that the flow of electricity through the monitored circuit was cut off or (ii) that the repair event has been scheduled.

9. The computer-implemented method of claim 8, wherein communicating the indication further comprises:
    communicating the indication to the insurance provider, wherein the communication causes the performance of an insurance-related action, the insurance-related action including at least one of:
    an update of an insurance policy or premium,
    an adjustment of an insurance discount or award,
    a processing of an insurance claim, or a recommendation to purchase at least one additional device or insurance product.

10. The computer-implemented method of claim 1, wherein:
the circuit monitoring device monitors two or more circuits, and
the instruction identifies a particular circuit of the two or more circuit for the circuit monitoring device to re-close.

11. A system for repairing damage to a property populated with a plurality of devices, the system disposed on the property and including a circuit monitoring device associated with the property, the system comprising:
a plurality of transceivers adapted to communicate data;
a memory adapted to store non-transitory computer executable instructions; and
one or more processors adapted to interface with the plurality of transceivers, wherein the one or more processors are configured to execute the non-transitory computer executable instructions to cause the system to:
determine, by the one or more processors, that the circuit monitoring device cut off a flow of electricity through a monitored circuit;
responsive to the determination, transmit, via the plurality of transceivers to the circuit monitoring device, an instruction to re-close the monitored circuit, wherein the instruction is formatted such that the circuit monitoring device re-closes the monitored circuit upon receipt of the instruction;
subsequent to transmitting the instruction, determine, by the one or more processors, that the circuit monitoring device cut off the flow of electricity through the monitored circuit within a threshold amount of time since the first determination;
responsive to the second determination, generate, by the one or more processors, a repair request, the repair request indicating a need to repair an electrical condition associated with the monitored circuit; and
communicate, to a repair service provider via the plurality of transceivers, the repair request, wherein communicating the repair request causes a repair event to be scheduled.

12. The system of claim 11, wherein to generate the repair request, the one or more processors are further configured to execute the non-transitory computer executable instructions to cause the system to:
transmit, to an electronic device of an individual associated with the property, a recommended repair request, wherein the transmitting causes the electronic device to display the recommended repair request;
receive, from the electronic device, an indication of a preference of the individual, the preference relating to the repair event; and
update, by the one or more processors, the recommended repair request to include the received preference.

13. The system of claim 12, wherein to transmit the recommended repair request, the one or more processors are further configured to execute the non-transitory computer executable instructions to cause the system to:
generate, by the one or more processors, the recommended repair request, the recommended repair request indicating a recommended repair service provider, wherein the recommended repair service provider is selected based upon profile data associated with the individual.

14. The system of claim 11, wherein to cause the repair event to be scheduled, the one or more processors are further configured to execute the non-transitory computer executable instructions to cause the system to:
update, by the one or more processors, a service log associated with at least one of the circuit monitoring device or a device of the plurality of devices connected to the monitored circuit.

15. The system of claim 11, wherein to determine that the circuit monitoring device cut off the flow of electricity through the monitored circuit, the one or more processors are further configured to execute the non-transitory computer executable instructions to cause the system to:
receive, from the circuit monitoring device via the plurality of transceivers, an indication that the circuit monitoring device has been tripped.

16. The system of claim 11, wherein to generate the repair request, the one or more processors are further configured to execute the non-transitory computer executable instructions to cause the system to:
generate, by the one or more processors, the repair request only if the second determination occurs within a threshold amount of time from the first determination.

17. The system of claim 11, wherein the one or more processors are further configured to execute the non-transitory computer executable instructions to cause the system to:
communicate, to an insurance provider associated with the property via the plurality of transceivers, an indication of at least one of (i) that the flow of electricity through the monitored circuit was cut off or (ii) that the repair event has been scheduled.

18. A non-transitory computer-readable storage medium storing processor-executable instructions, that when executed cause one or more processors to:
determine, by the one or more processors of a home controller disposed on the property, that the circuit monitoring device cut off a flow of electricity through a monitored circuit;
responsive to the determination, transmit, from the home controller via a first wired or wireless communication network to the circuit monitoring device, an instruction to re-close the monitored circuit, wherein the instruction is formatted such that the circuit monitoring device re-closes the monitored circuit upon receipt of the instruction;
subsequent to transmitting the instruction, determine, by the one or more processors, that the circuit monitoring device cut off the flow of electricity through the monitored circuit within a threshold amount of time of the first determination;
responsive to the second determination, generate, by the one or more processors, a repair request, the repair request indicating a need to repair an electrical condition associated with the monitored circuit; and
communicate, to a repair service provider via the first wired or wireless communication network, the repair request, wherein communicating the repair request causes a repair event to be scheduled.

19. The non-transitory computer-readable storage of claim 18, wherein to generate the repair request, the processor-executable instruction, when executed, further cause the one or more processors to:
transmit, to an electronic device of an individual associated with the property, a recommended repair request, wherein the transmitting causes the electronic device to display the recommended repair request;

receive, from the electronic device, an indication of a preference of the individual, the preference relating to the repair event; and update, by the one or more processors, the recommended repair request to include the received preference.

20. The non-transitory computer-readable storage of claim 18, wherein to cause the repair event to be scheduled, the processor-executable instruction, when executed, further cause the one or more processors to:

update, by the one or more processors, a service log associated with at least one of the circuit monitoring device or a device of the plurality of devices connected to the monitored circuit.

* * * * *